US009420026B2

(12) United States Patent
Baldwin et al.

(10) Patent No.: US 9,420,026 B2
(45) Date of Patent: Aug. 16, 2016

(54) DISTRIBUTING COMMUNICATION OF A DATA STREAM AMONG MULTIPLE DEVICES

(71) Applicant: AT&T Intellectual Property I, L.P., Atlanta, GA (US)

(72) Inventors: Christopher Baldwin, Crystal Lake, IL (US); Bruce Barnes, Pingree Grove, IL (US); Wayne Robert Heinmiller, Elgin, IL (US); Patrick Kenny, Barrington, IL (US); Dolores J. Mallian, St. Charles, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 377 days.

(21) Appl. No.: 13/665,058

(22) Filed: Oct. 31, 2012

(65) Prior Publication Data

US 2014/0122656 A1 May 1, 2014

(51) Int. Cl.
  *G06F 15/16* (2006.01)
  *H04L 29/06* (2006.01)
  *H04L 29/08* (2006.01)

(52) U.S. Cl.
  CPC .......... *H04L 65/602* (2013.01); *H04L 65/4084* (2013.01); *H04L 65/80* (2013.01); *H04L 67/327* (2013.01)

(58) Field of Classification Search
  USPC ........................................................ 370/229
  See application file for complete search history.

(56) References Cited

U.S. PATENT DOCUMENTS

| | | | | |
|---|---|---|---|---|
| 5,771,229 A | * | 6/1998 | Gavrilovich | 370/342 |
| 5,841,777 A | * | 11/1998 | Cohen | 370/443 |
| 6,564,261 B1 | * | 5/2003 | Gudjonsson et al. | 709/227 |
| 6,842,446 B2 | * | 1/2005 | Everson et al. | 370/349 |
| 6,910,149 B2 | * | 6/2005 | Perloff et al. | 714/4.3 |
| 7,031,301 B1 | * | 4/2006 | Oz et al. | 370/352 |
| 7,139,791 B1 | * | 11/2006 | Coleman | 709/203 |
| 7,542,456 B2 | * | 6/2009 | Garg et al. | 370/341 |
| 7,675,939 B2 | * | 3/2010 | Kawamura et al. | 370/469 |
| 7,805,156 B1 | * | 9/2010 | Allen et al. | 455/550.1 |
| 7,894,470 B2 | * | 2/2011 | Ruckart | 370/464 |
| 7,924,798 B1 | * | 4/2011 | Brown et al. | 370/341 |
| 7,940,661 B2 | * | 5/2011 | Ervin et al. | 370/232 |
| 8,068,450 B2 | * | 11/2011 | Kozisek | 370/328 |

(Continued)

OTHER PUBLICATIONS

ADTRAN, Inc., "Why Buy ATLAS Video Switch, ATLAS 800 Series," Mar. 2004 (2 pages).

(Continued)

*Primary Examiner* — Hua Fan
(74) *Attorney, Agent, or Firm* — Hanley, Flight & Zimmerman, LLC

(57) ABSTRACT

Disclosed example methods to distribute communication of a data stream include, in response to a request received from a first device, assigning a number of communication ports to a stream splitting session via which communication of the data stream is to be distributed among a plurality of devices. Such example methods also include determining a type of the request from among a plurality of possible types. Such example methods further include, when the request corresponds to a first type, providing information to the first device for distribution among the plurality of devices, the information to be used to establish respective data connections via which respective portions of the data stream are to be received by the plurality of devices during the stream splitting session.

17 Claims, 11 Drawing Sheets

(56) References Cited

U.S. PATENT DOCUMENTS

| | | | |
|---|---|---|---|
| 8,259,814 B2* | 9/2012 | Rodriguez et al. | 375/240.25 |
| 8,406,778 B2* | 3/2013 | Allen et al. | 455/450 |
| 8,520,535 B2* | 8/2013 | Dawson et al. | 370/252 |
| 8,681,720 B2* | 3/2014 | Bergman et al. | 370/329 |
| 8,806,048 B2* | 8/2014 | Kim et al. | 709/231 |
| 2002/0004788 A1* | 1/2002 | Gros et al. | 705/80 |
| 2006/0179153 A1* | 8/2006 | Lee et al. | 709/231 |
| 2007/0033282 A1* | 2/2007 | Mao et al. | 709/226 |
| 2007/0294423 A1* | 12/2007 | Brockenbrough et al. | 709/231 |
| 2008/0104170 A1* | 5/2008 | Ananthanarayanan | 709/204 |
| 2008/0175188 A1 | 7/2008 | Kozisek | |
| 2009/0046740 A1 | 2/2009 | Ruckart | |
| 2009/0234967 A1* | 9/2009 | Yu et al. | 709/232 |
| 2011/0040888 A1* | 2/2011 | Krishnaswamy et al. | 709/231 |
| 2011/0110324 A1 | 5/2011 | Ruckart | |
| 2011/0116444 A1* | 5/2011 | Relyea | 370/328 |
| 2011/0296006 A1* | 12/2011 | Krishnaswamy et al. | 709/224 |
| 2012/0110206 A1* | 5/2012 | Bhatt et al. | 709/238 |

OTHER PUBLICATIONS

Kear, Sam, "Dual Wan Router—How to Load Balance Using pfSen," <http://skear.hubpages.com/hub/Dual-Wan-Router-How-To-Build-One-On-a-Budget>, accessed on Nov. 29, 2011 (7 pages).

Vicomsoft, "Bandwidth Aggregation, Bonding and Teaming," http://www.vicomsoft.us/learning-center/bandwidth-aggregation-bonding-and-teaming/, accessed on Nov. 29, 2011 (11 pages).

Wikipedia, "Channel bonding," <http://en.wikipedia.org/wiki/Channel_bonding>, accessed on Apr. 10, 2012 (2 pages).

Wikipedia, "Link aggregation," <http://en.wikipedia.org/wiki/Link_aggregation>, accessed on Apr. 10, 2012 (8 pages).

Wikipedia, "Stackable switch," <http://en.wikipedia.org/wiki/Stackable_switch>, accessed on Nov. 29, 2011 (3 pages).

* cited by examiner

DISTRIBUTING COMMUNICATION OF A DATA STREAM AMONG MULTIPLE DEVICES

FIELD OF THE DISCLOSURE

This disclosure relates generally to data communications and, more particularly, to distributing communication of a data stream among multiple devices.

BACKGROUND

Consumers are becoming accustomed to near ubiquitous access to Internet-based and web-based services and applications. In the past, data intensive applications, such as steaming video, on-demand video, video conferencing, etc., were limited to devices, such as personal computers, set-top boxes, stand-alone video conferencing systems, etc., having dedicated, high-speed (e.g., broadband) data connections provided by an Internet service provider (ISP). Today, consumers have access to a plethora of electronic devices, including smartphones, tablet computers, personal data devices, personal digital assistants, etc., that support Internet connectivity, and may have sufficient processing power to support at least some media-rich applications. However, while a consumer may own or have access to a number of such electronic devices, the data bandwidth capabilities of each individual device may be limited such that none of the consumer's devices, on its own, can support the data transfer speeds associated with a data intensive application the consumer wishes to access.

BRIEF DESCRIPTION OF THE DRAWINGS

Wherever possible, the same reference numbers will be used throughout the drawing(s) and accompanying written description to refer to the same or like element, parts, etc.

DETAILED DESCRIPTION

Figure 1:
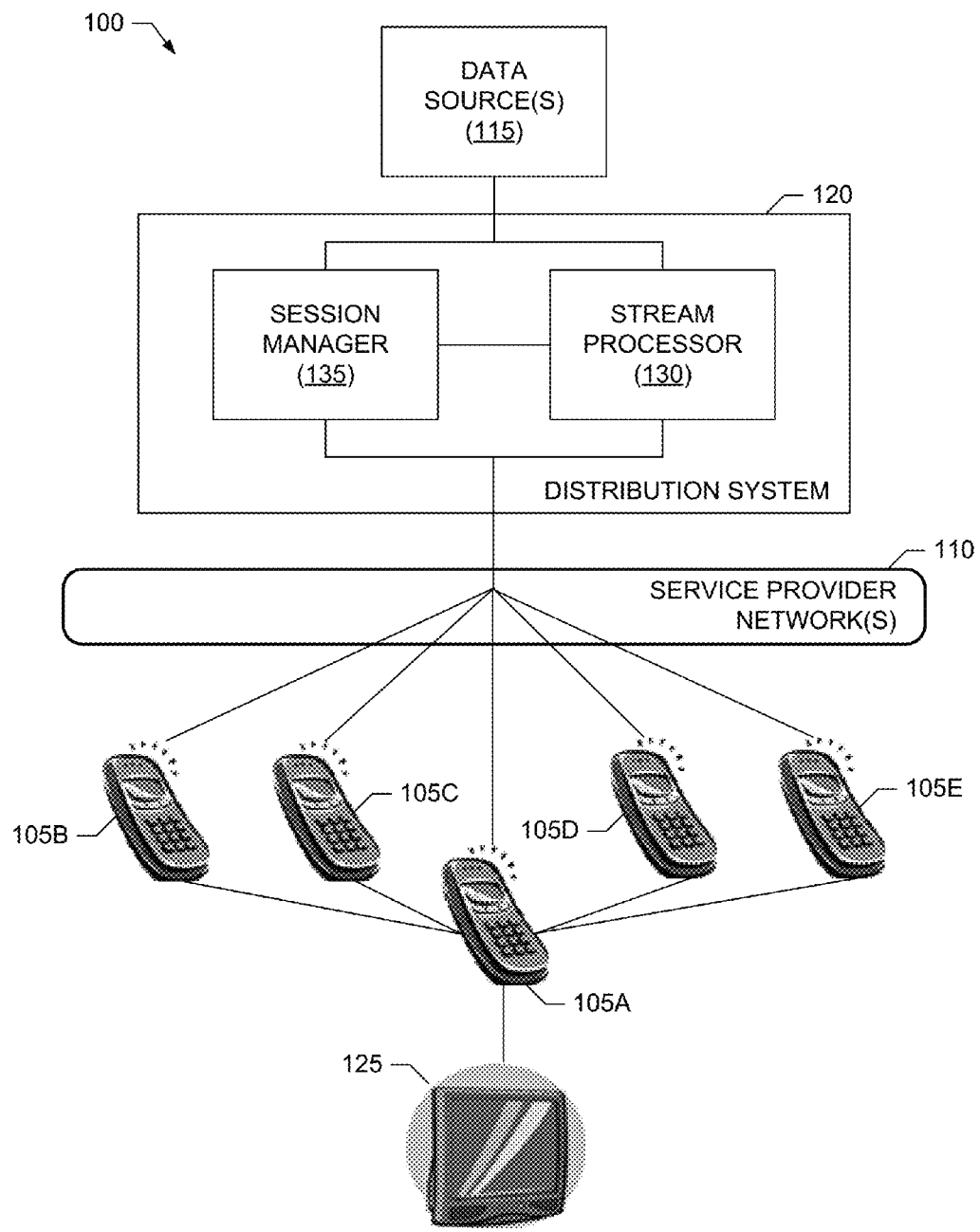
FIG. 1 is a block diagram of an example communication system capable of distributing communication of a data stream among multiple example devices as disclosed herein.

Methods, apparatus and articles of manufacture (e.g., storage media) for distributing communication of a data stream among multiple devices are disclosed herein. Example methods disclosed herein to distribute communication of a data stream include, in response to a request received from a first device, assigning a first number of communication ports to a stream splitting session via which communication of the data stream is to be distributed among multiple devices. Such example methods also include determining a type of the request from among a plurality of possible types. Such example methods further include, when the request corresponds to a first type of request, providing port information to the first device for distribution among the multiple devices. The port information is to be used to establish respective data connections via which respective portions of the data stream are to be received by the multiple devices during the stream splitting session. Furthermore, some such example methods include, when the request corresponds to a second type of request different from the first type of request, using a first one of the communication ports to establish a first data connection with the first device via which a first portion of the data stream is to be received by the first device during the stream splitting session.

In some examples, the first type of request corresponds to a single device request that is to be received from a primary device on behalf of a group of devices to be included in the stream splitting session. In such examples, the single device request is to identify a source of the data stream and a number of devices to be included in the stream splitting session. Also, in some examples, the port information provided to the first device when the request corresponds to the first type identifies the communication ports assigned to the stream splitting session. In some examples, the first number of communication ports is at least equal to (e.g., is equal to or greater than) the number of devices included in the stream splitting session.

In some example methods, such as methods in which the request corresponds to the first type of request and the multiple devices correspond to a first group of devices, such methods further include receiving a second request corresponding to the first type of request from a second device, further assigning a second number of communication ports, in addition to the first communication ports, to the stream splitting session, and providing second port information to the second device for distribution among a second group of devices. In such examples, the second port information is to be used by the second group of devices to establish respective data connections via which respective portions of the data stream are to be received during the stream splitting session. In such examples, the communication of the data stream is to be distributed among the first and second groups of devices during the stream splitting session. In some such examples, the first type of request corresponds to a hybrid request that is to be received from each of a set of primary devices on behalf of respective groups of devices to be included in the stream splitting session. In such examples, each respective hybrid device request is to identify a source of the data stream, a number of devices included in the respective group of devices corresponding to the respective hybrid device request, and a group identifier to collectively represent the groups of devices to be included in the stream splitting session.

In some examples, the second type of request corresponds to a multi-device request that is to be received from each device in a group of devices to be included in the stream splitting session. In such examples, the multi-device request is to identify a source of the data stream, a number of devices to be included in the stream splitting session, and a group identifier to collectively represent the group of devices to be included in the stream splitting session.

Some example methods disclosed herein further include obtaining respective streaming capability information from each respective device included in a stream splitting session when a respective data connection is established with each respective device. Such example methods also include splitting the data stream into respective portions to be communicated to the multiple devices such that the splitting is performed based on the respective streaming capability information obtained from each respective device. Some such example methods further include monitoring for changes to the respective data connection established with each respective device, and/or monitoring for an additional device to be added to the stream splitting session. Such example methods can also include adjusting the splitting based on such monitoring.

These and other example methods, apparatus, systems and articles of manufacture (e.g., physical storage media) to distribute communication of a data stream among multiple devices are disclosed in greater detail below.

As noted above, a consumer may have access to multiple electronic devices that support Internet connectivity, but none of these devices may have sufficient data bandwidth capability, on its own, to support the data intensive applications the consumer may wish to access. For example, a lack of sufficient data bandwidth may prevent a consumer from using a given one of her electronic devices to view a streaming video, participate in a video conference, etc., or may at least degrade the consumer's experience when accessing such applications. In many circumstances, the consumer has access to a number of electronic devices having a combined bandwidth that would be sufficient to support the desired data intensive application. Thus, while the total bandwidth available to the consumer would be sufficient, the distribution of this bandwidth among multiple, individual devices (e.g., which may be of different types) has, in the past, prevented this available bandwidth from being used to its full potential.

Example methods, apparatus and articles of manufacture disclosed herein can overcome at least some of these prior limitations, and enable the bandwidth from multiple devices to be combined. For example, such disclosed example methods, apparatus and articles of manufacture distribute communication of a data stream (e.g., such as a high-speed data stream corresponding to a streamlining video application, a video conferencing application, etc.) among the multiple devices, thereby enabling the limited bandwidth of each device to be combined to realize a data communication session (referred to herein as a stream splitting session) having a higher overall bandwidth. Prior techniques for combining the bandwidth of separate communication links, such as link bonding or aggregation, can be limited in that they are restricted to use with fixed, or static, communication links implemented using the same technology and/or provided by the same service provider, and/or require the communication links being combined to terminate at the same communication endpoint.

Unlike such prior techniques, example methods, apparatus and articles of manufacture disclosed herein enable distribution of the communication of a data stream among multiple, different endpoints (e.g., electronic devices), which may be the same or different and which may receive service (e.g., Internet service) from the same or different providers. For example, such endpoints may be the same or different types of devices (e.g., phones, tablets, computers, etc., or any combination thereof) associated with the same subscriber or end user, or two or more different subscribers or end users. Also, example methods, apparatus and articles of manufacture disclosed herein support distribution of the data stream among different data connections in accordance with the different device capabilities of the devices with which the data connections are established. Furthermore, example methods, apparatus and articles of manufacture disclosed herein support flexible combining of device bandwidth such that, for example, devices may be added to and/or removed from a stream splitting session while the data stream is still being communicated. Further aspects of the disclosed example methods, apparatus and articles of manufacture are described in greater detail below.

Turning to the figures, a block diagram of an example communication system 100 capable of distributing communication of a data stream among multiple example devices as disclosed herein is illustrated in FIG. 1. The communication system 100 includes multiple example user devices 105A-E in communication with one or more example service provider networks 110. The service provider network(s) 110 can correspond to any type of service provider network, such as a mobile service provider network (e.g., such as a third generation (3G) mobile/cellular network, a fourth generation (4G) mobile/cellular network, etc.), a broadband service provider network (e.g., such as a digital subscriber line (DSL) network), a cable service provider network, a satellite service provider network, an Internet service provider (ISP) network, a WiFi network, etc., capable of providing access to the Internet and/or any service-oriented and/or content delivery network. In the example communication system 100 of FIG. 1, Internet service is provided to each of the multiple user devices 105A-E by the same or different service provider network(s) 110. Furthermore, the user devices 105A-E may have different device capabilities such that, for example, some or all of the user devices 105A-E have different respective bandwidth or data rate limits, latencies, etc., for data received from and/or transmitted to the service provider network(s) 110.

Although the user devices 105A-E are depicted as mobile phones in FIG. 1, the user devices 105A-E are not limited thereto. For example, the user devices 105A-E can each be any device that is capable of accessing the service provider network(s) 110, which in turn provide access to the Internet and/or any other type(s) of content delivery and/or service-oriented network(s). Each user device 105A-E is also able to exchange data with other external device(s), such as via tethering and/or any external data connection (such as a Wi-Fi connection, a Bluetooth connection, a universal serial bus (USB) connection, a docking connection, etc.). As such, the user devices 105A-E can be implemented by, for example, mobile devices (such as smartphones, cellular phones, 3G, 4G or long term evolution (LTE) wireless devices, etc.), wireless access points (such as Wi-Fi devices, Bluetooth devices, aircards, etc.), personal data devices (such as personal digital assistants (PDAs), e-readers, etc.), broadband modems (such as DSL modems, cable modems, satellite modems, etc.) and/or any other type(s) of electronic devices (e.g., tablets, personal computers, etc.) or combinations thereof.

In the illustrated example of FIG. 1, the service provider network(s) 110 provide the user devices 105A-E with access to one or more example data sources 115. The data sources(s) 115 can include, for example, one or more streaming media sources (e.g., such as streaming services offered by Netflix®, Hulu®, etc.), one or more on-demand media download sources (e.g., such as Apple iTunes®), one or more video conferencing services, etc. The data source(s) 115 can also include other user devices (not shown) capable of uploading content (e.g., such as video chat content) that is able to be received by the user devices 105A-E.

The example communication system 100 of FIG. 1 further includes an example distribution system 120 that enables the communication of a particular data stream from the data sources(s) 115 to be distributed (e.g., split) among the multiple user devices 105A-E. For example, the distribution system 120 may be used to distribute respective portions of a data stream, which is being communicated from a data source 115, to some or all of the multiple user devices 105A-E. As described in greater detail below, the partial data streams received by some or all of the user devices 105A-E are then aggregated to form the original data stream, which may be processed by one of the user devices (e.g., such as for presentation by the user device 105A) and/or forwarded to an example output device 125 (e.g., such as for presentation by the output device 125). In this way, the individual bandwidths and/or data transmission capacity limits of each of the user devices 105A-E can be combined to yield an aggregated bandwidth and/or data transmission capacity capable of carrying a data stream that would not have been supported by the individual user devices 105A-E otherwise. The output device 125 of the illustrated example can be implemented by any type of device capable of processing, presenting and/or otherwise using a data stream, such as a television, a set-top box, a personal computer, etc., and/or any other type of user device, such as device similar to the user devices 105A-E described above.

To support distributing communication of a data stream among the multiple user devices 105A-E as disclosed herein, the distribution system 120 of the illustrated example further includes an example stream processor 130 and an example session manager 135. As described in greater detail below, the stream processor 130 is responsible for splitting a complete data stream being provided by a data source 115 into multiple partial data streams corresponding to respective portions of the complete data stream, which are to be communicated to the respective user devices 105A-E. As described in greater detail below, the session manager 135 is responsible for establishing, monitoring and otherwise managing a stream splitting session, as well as the individual data connections with the user devices 105A-E that collectively form the stream splitting session via which the original data stream is communicated as a group of partial data streams to the user devices 105A-E.

In the example communication system 100 of FIG. 1, the distribution system 120, which includes the stream processor 130 and the session manager 135, may or may not be included in the service provider network(s) 110. For example, the distribution system 120 may be implemented by one or more server platforms in the service provider network(s) 110. Additionally or alternatively, the distribution system 120 may be implemented by a content delivery network or other service-oriented network connecting the data source(s) 115 with the service provider network(s) 110. Because the distribution system 120 may be implemented outside of the service provider network(s) 110, the session manager 135 may not be able to rely on the service provider network(s) 110 to establish the data connections with the user devices 105A-E among which the data stream provided by the target data source 115 is to be distributed during a stream splitting session. For example, some of the user devices 105A-E may receive service from different service provider network(s) 110, and the service provider network(s) 110 may act as pass-throughs for the communication messages associated with establishing the stream splitting session and the associated data connections for data stream distribution.

As described in greater detail below, the distribution system 120 in the communication system 100 of the illustrated example can support a single mechanism, or multiple different mechanisms, for establishing a stream splitting session for distributing the communication of a data stream among some or all of the user devices 105A-E. For example, the distribution system 120 can support a first mechanism that establishes a stream splitting session in response to receiving a single device request from one of the user devices 105A-E, such as the user device 105A, on behalf of the group of user devices 105A-E to be included in the stream splitting session. In such examples, the user device 105A is referred to as a primary device, and the remaining user devices in the group are referred to as secondary devices. Additionally or alternatively, the distribution system 120 can support a second mechanism that establishes the stream splitting session in response to receiving multi-device requests from each of the user devices 105A-E to be included in the stream splitting session. Additionally or alternatively, the distribution system 120 can support a third mechanism that establishes the stream splitting session in response receiving hybrid requests from each of a set of primary devices on behalf of respective groups of devices to be included in the stream splitting session.

A first example operation of the communication system 100 to distribute communication of a data stream among the multiple user devices 105A-E is now described. Consider, for example, a scenario in which the distribution system 120 supports the first mechanism described above in which the distribution system 120 establishes a stream splitting session in response to receiving a single device request from a primary device from among a group of some or all of the user devices 105A-E that are to be included in the stream splitting session. Further assume that a user endeavors to use the primary device 105A to access a data source 115 to begin data streaming or downloading using data stream distribution as disclosed herein. In such an example, the user device 105A operates as the primary device and is responsible for establishing the stream splitting session on behalf of the user devices 105A-E, and for selecting the target data source 115. As noted above, the other user devices 105B-E are referred to herein as secondary devices to be included in the stream splitting session that is to convey the data stream from the selected data source 115 to the user devices 105A-E.

In such examples, the primary device 105A establishes local communication links with one or more of the secondary user devices 105B-E. For convenience, and without loss of generality, it is assumed that all of the user devices 105A-E are to be included in the stream splitting session. For example, the user devices 105A-E can establish an ad-hoc network, tethering connections and/or other local communication links via any appropriate technology, such as Wi-Fi connections, Bluetooth connections, USB connections, a docking connections, etc. In the illustrated example, the primary device 105A uses the local communication links to determine the number of secondary devices 105B-E that are to be included in the stream splitting session to be used to distribute communication of a particular target data stream. For example, the primary device 105A can send queries to each of the secondary devices 105B-E and including the device(s) that respond in the stream splitting session group. The primary device 105A then sends a stream splitting session request for receipt by the distribution system 120. In this first example operation of the communication system 100, the stream splitting session request received by the distribution system 120 from the primary device 105A is a single device request which requests that a stream splitting session be established to distribute a data stream from a target data source 115. Accordingly, such a primary device request identifies the target data source 115 and indicates the total number of user devices 105A-E to be included in the stream splitting session. In some examples, the primary device 105A also provides credentials (e.g., such as a username and password) to permit access to protected information, such as customer account information specifying whether the primary device 105A (or a user of the primary device 105A) is subscribed to a stream splitting service or is otherwise authorized to make the stream splitting session request, data source account information (e.g., such as a username and password) to permit access to the target data source 115, etc.

In this first example operation of the communication system 100, the service provider network 110 serving the primary device 105A receives the stream splitting session request from the primary device 105A and forwards it to the session manager 135. In response to receiving the stream splitting session request, which is a single device request in this example, the session manager 135 assigns a session identifier to identify the requested stream splitting session, and a number of communication ports for servicing the requested stream splitting session. In some examples, the number of communication ports assigned by the session manager 135 to the requested stream splitting session is at least equal to (e.g., is equal to or greater than) the total number of user devices 105A-E identified in the received stream splitting session request as being included in the stream splitting session. For example, the session manager 135 may assign a number of communication ports greater than the number of user devices 105A-E to be included in the stream splitting session to allow additional user devices to be added to the stream splitting session over time. In some examples, the communication ports assigned to a stream splitting session correspond to a set of communication protocol port numbers, such as port numbers defined according to the transmission control protocol (TCP) and/or Internet protocol (IP), and/or some other protocol, that are accessible via one or more network addresses, such as one or more IP addresses, one or more uniform resource identifiers (URIs), etc.

After assigning the session identifier and the communication ports to the requested stream splitting session, the session manager 135 returns the stream splitting session identifier and port information identifying the communication ports assigned to the stream splitting session to the primary device 105A. For example, the stream splitting session identifier can be a unique numeric or alphanumeric identifier (or at least unique within a geographic area including the primary device 105A) and the port information can include the port numbers, or range of port numbers, assigned by the session manager 135 to the stream splitting session. In response to receiving the session identifier and port information for the stream splitting session from the session manager 135, the primary device 105A of the illustrated example forwards this information to the secondary devices 105B-E via the local communication links for use in establishing respective data connections with the distribution system 120. For example, the primary device 105A may use any appropriate technique (such as random assignment, in-order assignment, etc.) to allocate the stream splitting session's communication ports to itself and the secondary user devices 105B-E to be included in the stream splitting session. In such examples, the primary device 105A forwards, to a respective one of the secondary user devices 105B-E, the session identifier and the information identifying the particular communication port allocated by the primary device 105A to the respective secondary device 105B-E.

To establish respective data connections with each of the user devices 105A-E to be included in the stream splitting session, each user device 105A-E then sends a data connection request to the distribution system 120 using the communication port information received from the session manager 135 and allocated to the respective individual user devices by the primary device 105A. In some examples, the data connection requests received from the user devices 105A-E include the stream splitting session identifier to enable each received request to be associated with the appropriate stream splitting session. Thus, in response to receiving a data connection request from a particular user device 105A-E at a communication port assigned to a particular stream splitting session and including the proper session identifier, the session manager 135 establishes a data connection with the particular user device 105A-E and associates the data connection with the stream splitting session.

In some examples, the session manager 135 further establishes the data connections with the devices 105A-E by associating respective data transmission characteristic(s) with each of the data connections. In this way, the distribution system 120 can split a target data stream into a number of partial data streams that are appropriately sized based on the respective capabilities of the receiving user devices 105A-E. In the illustrated example, the data transmission characteristic(s) are determined by the session manager 135 based on device capability information obtained for the user devices 105A-E. For example, the session manager 135 can allocate different bandwidth and/or data rate limits to some or all of the data connections based on the device capability information for each of the devices 105A-E. For example, the session manager 135 may exchange communication messages, such a network ping messages, with each of the user devices 105A-E included in a stream splitting session to determine respective device capability information for the user devices 105A-E, such as bandwidth and/or data rate capabilities, network latencies, etc. Additionally or alternatively, the session manager 135 may exchange communication messages with one or more of the user devices 105A-E to ascertain the ability of the device(s) to process (e.g., relay and/or aggregate) the received partial data streams. Then, the session manager 135 associates respective data transmission characteristic(s) with the data connections established with the user devices 105A-E, with the data transmission characteristic(s) being based on the determined device capability information.

After establishing the data connections with the respective devices 105A-E and determining their respective data transmission characteristics, the session manager 135 then initiates the data stream from target data source 115 using the target data source identification information included in the stream splitting session request received from the primary device 105A. The session manager 135 also invokes the stream processor 130 to begin splitting of the complete data stream among the respective data connections with the user devices 105A-E.

In the illustrated example, the stream processor 130 receives the complete data stream from the target data source 115 corresponding to the target data source identification information included in the stream splitting session request. The stream processor 130 splits the complete data stream into partial data streams to be communicated to the user devices 105A-E using the data connections established by the session manager 135 and the service provider network(s) 110. In some examples, the stream processor 130 generates partial data streams having different data transmission characteristics, such as different bandwidth limits and/or data rate limits, according to the respective data transmission characteristics associated with the communication paths established with the user devices 105A-E. In some examples, the stream processor 130 may also perform transcoding to change/modify one or more data stream characteristics when splitting the complete data stream into the partial data streams, as described in greater detail below.

In the illustrated example, the user devices 105A-E receive their respective partial bit streams from the stream processor 130 via the established data connections. The received partial bits streams are then aggregated (e.g., possibly after reordering to account for different data packet arrival times at the different user devices 105A-E) to form the complete data stream being provided by the target data source 115. Any appropriate aggregation technique can be employed in the communication system 100 to aggregate the partial data streams received by the user devices 105A-E. For example, as illustrated in the example of FIG. 1, the secondary devices 105B-E can forward their respective received partial data streams to the primary device 105A via the local communication links previously established (as described above) between the user devices 105A-E. In such examples, the primary device 105A aggregates the partial data streams received from the secondary devices 105B-E with its own received partial data stream to form the complete data stream being provided by the target data source 115. The primary device 105A can then process/present the complete data stream itself, or convey the complete data stream to the output device 125 for processing/presentation.

Additionally or alternatively, in some examples, the user devices 105A-E support hierarchical aggregation of the partial data streams to form the complete data stream provided by the target data source 115. In such examples, subsets of the user devices 105A-E work cooperatively to perform a first level of data stream aggregation (e.g., which can be performed in parallel among the different device subsets). For example, the secondary device 105B could perform aggregation of the partial data streams received by the secondary devices 105B-C, and the secondary device 105D could perform aggregation of the partial data streams received by the secondary devices 105D-E. The resulting aggregated streams from the first level of aggregation can then be provided to another device, such as the primary device 105A, to perform a next level of data stream aggregation. Additional levels of aggregation can be implemented, as appropriate.

Additionally or alternatively, in some examples, the user devices 105A-E provide their respective received partial data streams to the output device 125, which is responsible for performing the data stream aggregation.

In some examples, the session manager 135 and/or the primary device 105 of the communication system 100 monitor the status of the stream splitting session and the associated data connections established between the distribution system and the user devices 105A-E to determine whether to modify distribution of the complete data stream among the multiple devices 105A-E. For example, if one or more of the user devices 105A-E is/are no longer available (e.g., due to leaving the operating area, being turned-off, etc.), the session manager 135 and/or the primary device 105 can detect such a change and cause the complete data stream to be distributed just over the remaining user devices 105A-E. Also, in some examples, the session manager 135 may receive messages from one or more of the user devices 105A-E indicating the utilization of their respective capacities. Additionally or alternatively, the session manager 135 may receive messages from the service provider network(s) 110 regarding the current data communication capabilities of the data connections established between the distribution system 120 and one or more of the user devices 105A-E. Additionally or alternatively, a new user device (not shown) may become available (e.g., by entering the operating area, by being turned on, etc.) for inclusion in the group of devices 105A-E among which the complete data stream is to be distributed. In such examples, the session manager 135 and/or the primary device 105A can detect such a change and cause the complete data stream to be distributed over the new group user devices 105A-E. For example, the session manager 135 may receive stream splitting session request(s) or data connection request(s) from new devices that include a group code identifying a group of user devices already associated with an existing stream splitting session, which causes the new device(s) to be added to the session. Such monitoring capabilities enable the communication system 100 to continue providing the complete data stream from the target data source to the user devices 105A-E even as the composition of the user devices 105A-E changes.

A second example operation of the communication system 100 to distribute communication of a data stream among the multiple user devices 105A-E is now described. Consider, for example, a scenario in which, in addition or as an alternative to the aforementioned first mechanism, the distribution system 120 supports the second mechanism described above in which the distribution system 120 establishes a stream splitting session in response to receiving multi-device requests from each of the user devices 105A-E that are to be included in the stream splitting session. In such an example, one of the user devices 105A-E, such as the user device 105A, may still serve as a primary device for causing the local communication links among the user devices 105A-E to be established and for selecting a target data source 115 for which streaming or downloading using data stream distribution as disclosed herein is to commence. However, unlike in the first example operation involving the first mechanism described above, in this second example operation involving the second mechanism, each user device 105A-E is responsible for causing the stream splitting session to be established among the user devices 105A-E.

For example, in the second example operation of the communication system 100, upon establishing the local communication links among the user devices 105A-E, the primary device 105A assigns a group code to collectively identify the group of user devices 105A-E to be included in the stream splitting session. (Alternatively, any mechanism for assigning a group code can be used.) For example, the group code can be a unique numeric or alphanumeric identifier (or at least unique within a geographic area including the primary device 105A). The primary device 105A is then used to select the target data source 115, and the primary device 105A provides a target source identifier for the target data source 115 to the secondary user devices 105B-E that are to be included in the stream splitting session group. However, instead of only the primary device 105A sending a single device request to the distribution system 120 to initiate the stream splitting session, in the second example operation of the communication system 100, each user device 105A-E sends a respective stream splitting session request in the form of a multi-device request to the distribution system 120. Accordingly, in at least some examples, each multi-device request received from each respective user device 105A-E to be included in a stream splitting session includes the group code identifying the group of devices 105A-E to be included in the stream splitting session, as well as information identifying the target data source 115 and indicating the total number of user devices 105A-E to be included in the stream splitting session. In some examples, the primary device 105A (or one of the other devices 105B-E in the group) also provides credentials (e.g., such as a username and password) to permit access to protected information, such as customer account information specifying whether the primary device 105A (or a user of the primary device 105A or one of the other user devices 105B-E) is subscribed to a stream splitting service or is otherwise authorized to make the stream splitting session request, data source account information (e.g., such as a username and password) to permit access to the target data source 115, etc.

In this second example operation of the communication system 100, the respective service provider network 110 serving each user device 105A-E receives the respective stream splitting session request from the user device 105A-E and forwards it to the session manager 135. In response to receiving the first of these stream splitting session requests, which in this example is a multi-device request associated with a particular group code, the session manager 135 assigns a session identifier to identify the requested stream splitting session, associates the stream splitting session identifier with the group code received in the request, and assigns a number of communication ports for servicing the requested stream splitting session. As in the preceding example, the number of communication ports assigned by the session manager 135 to the requested stream splitting session can be at least equal to (e.g., is equal to or greater than) the total number of user devices 105A-E identified in the received stream splitting session request as being included in the stream splitting session. Assignment of the session identifier and communication ports can be performed as described in the preceding example.

After the session identifier and the communication ports have been assigned to the requested stream splitting session in response to receiving the first of the multi-device requests associated with a particular group code, for this and each subsequent multi-device request received for this group code, the session manager 135 reads the group code in a received multi-device request, identifies the stream splitting session associated with the group code, and uses one of the communication ports assigned to the stream splitting session to establish a respective data connection with the requesting device 105A-E. The session manager 135 also associates the respective data connection with the requested stream splitting session and, in some examples, provides the session identifier to the respective requesting device 105A-E. As such, in this second example operation of the communication system 100, separate data connection requests are not used to establish the respective data connections between the user devices 105A-E and the distribution system 120. Instead, the multi-device request received from each user device 105A-E operates to cause the respective data connection to be established between the respective user device 105A-E and the distribution system 120. After the respective data connections are established with the user devices 105A-E, operation then proceeds as described above in which the data stream from the target data source 115 is initiated, split among the data connections for communication to the user devices 105A-E, and then aggregated to re-form the complete data stream. Session monitoring can also be performed as described above.

A third example operation of the communication system 100 to distribute communication of a data stream among the multiple user devices 105A-E is now described. Consider, for example, a scenario in which, in addition or as an alternative to the aforementioned first and second mechanisms, the distribution system 120 supports the third mechanism described above in which the distribution system 120 establishes a stream splitting session in response to receiving hybrid requests from each of a set of primary devices on behalf of respective groups of devices to be included in the stream splitting session. For example, such a third mechanism that supports hybrid requests can enable multiple groups of user devices, each managed by a respective primary device, to be joined into a larger stream splitting session group. In some examples, a hybrid request for establishing a stream splitting session is similar to a single device request sent by a primary device on behalf of a first group of user devices, but also includes a group code or a stream splitting session identifier to enable subsequent hybrid requests to be joined with an existing stream splitting session.

By way of example, assume that the user device 105A has been configured to serve as the primary device 105A for the group of user devices 105A-C. In this third example operation of the communication system 100, which supports hybrid device requests, this first group of user devices 105A-C can be formed by the primary device 105A using the local communication links established, as described above, to assign a group code to identify the first group of user devices 105A-C as being included in the stream splitting session. The primary device 105A can also be used, as described above, to select the target data source 115. In such an example, the primary device 105A sends a stream splitting session request, in the form of a hybrid request, to the distribution system 120 to request establishment of a stream splitting session on behalf of the first group of user devices 105A-C. Accordingly, in at least some examples, the hybrid request received from the primary device 105A includes the group code identifying the group of devices 105A-C to be included in the stream splitting session, as well as information identifying the target data source 115 and indicating a first number of user devices 105A-C to be included in the stream splitting session. As described above, in some examples, the primary device 105A (or one of the other devices 105B-E in the group) also provides credentials (e.g., such as a username and password) to permit access to protected information, such as customer account information specifying whether the primary device 105A (or a user of the primary device 105A) is subscribed to a stream splitting service or is otherwise authorized to make the stream splitting session request, data source account information (e.g., such as a username and password) to permit access to the target data source 115, etc.

In this third example operation of the communication system 100, the service provider network 110 serving the primary device 105A receives the stream splitting session request, which is a first hybrid request associated with a particular group code, from the user device 105A and forwards it to the session manager 135. In response to receiving this first hybrid request associated with the particular group code, the session manager 135 assigns a session identifier to identify the requested stream splitting session, associates the stream splitting session identifier with the group code received in the request, and assigns a number of communication ports for servicing the requested stream splitting session. The number of communication ports assigned by the session manager 135 to the requested stream splitting session can be at least equal to (e.g., is equal to or greater than) the first number of user devices 105A-C identified in the received stream splitting session request as being included in the stream splitting session. Assignment of the session identifier and communication ports can be performed as described in the preceding example.

After assigning the session identifier and the communication ports to the requested stream splitting session, the session manager 135 returns the stream splitting session identifier and port information identifying the communication ports assigned to the stream splitting session to the primary device 105A. In response to receiving the session identifier and port information for the stream splitting session from the session manager 135, the primary device 105A of the illustrated example forwards this information to the secondary devices 105B-C via the local communication links for use in establishing respective data connections with the distribution system 120, as described above. After each of the user devices 105A-C establishes its respective data connection with the distribution system 120, operation proceeds as described above in which the data stream from the target data source 115 is initiated, split among the data connections for communication to the user devices 105A-C, and then aggregated to re-form the complete data stream. Session monitoring can also be performed as described above.

Next, assume that a second group of user devices 105D-E is formed in a similar manner, with the user device 105D being the primary device for the second group. In this third example operation of the communication system 100, the first and second groups can be joined into a single stream splitting session using hybrid requests as follows. For example, the first primary device 105A can operate as a group master and provide its group code (for the first group of devices 105A-C) to the second primary device 105D. The second primary device 105D can then include the first group code in a hybrid request sent to the distribution system 120, along with information identifying the target source and indicating the total number of user devices included in the second group of user devices 105D-E. In response to receiving this second hybrid request including the same group code as the first hybrid request, the session manager 135 associates the second received hybrid request with the existing stream splitting session established in response to the first hybrid request, and assigns an additional number of communication ports for servicing the existing stream splitting session. The additional number of communication ports assigned by the session manager 135 to the existing stream splitting session can be at least equal to (e.g., is equal to or greater than) the number of user devices identified in this second received stream splitting session request as being included in the second group of user devices 105D-E. Assignment of the session identifier and communication ports can be performed as described in the preceding examples.

After assigning the additional communication ports to the requested stream splitting session, the session manager 135 returns the stream splitting session identifier and port information identifying the additional communication ports assigned to the stream splitting session to the primary device 105D. In response to receiving the session identifier and port information for the stream splitting session from the session manager 135, the primary device 105D of the illustrated example forwards this information to the secondary device 105E (e.g., via the local communication links) for use in establishing respective data connections with the distribution system 120, as described above. After each of the user devices 105D-E establishes its respective data connection with the distribution system 120, the stream splitting session is augmented to split the complete data stream from the target source 115 among the respective data connections associated with both the first group of user devices 105A-C and the second group of user devices 105D-E. Furthermore, some such examples support hybrid stream aggregation in which the partial streams received in each group are aggregated by the respective primary devices managing each group. The respective primary devices (e.g., devices 105A and D in this example) then forward their respective aggregated streams to the master device (e.g., device 105A) for further aggregating and inclusion in a complete data stream.

As noted above, in some examples, the stream splitting session identifiers and/or group codes utilized in the communication system 100 may be unique only within given geographic regions. As such, in some examples, one or more of the user devices 105A-E may include location information in the stream splitting session request(s) sent to the distribution system 120. Such location information may be combined with session identifiers and/or group codes to associated received requests with a particular stream splitting session. Furthermore, in some such examples, the session manager 135 may identify groups of user devices 105A-E that are geographically co-located (e.g., within a specified or configured geographical distance of each other) as likely candidates for inclusion in a stream splitting session. Accordingly, the session manager 135 may then assign a single session identifier to user devices 105A-E that are geographically co-located.

Although five user devices 105A-E are illustrated in the example of FIG. 1, the communication system 100 can support distributing the communication of a data stream among any number of user devices 105A-E. The communication system 100 can also support any number and/or type(s) of data sources 115 and output devices 125. Furthermore, the communication system 100 can include any number of service provider networks 110 providing the user devices 105A-E with access to the Internet and/or any other content delivery and/or service oriented network(s). Moreover, although one distribution system 120 is illustrated in the example of FIG. 1, the communication system 100 can support any number of distribution systems 120 to distribute communication of data streams among multiple devices as disclosed herein. Furthermore, although the distribution system 120 is illustrated as being implemented outside of the service provider network(s) 110 in the example of FIG. 1, in other examples the distribution system 120 may be implemented by/in a service provider network 110. In such examples, the distribution system 120 may obtain, for example, the above-mentioned location information and/or device capability information for one or more of the user devices 105A-E directly from the service provider network 110 implementing the distribution system 120, rather than interacting with the user devices 105A-E to obtain such information.

Figure 2:
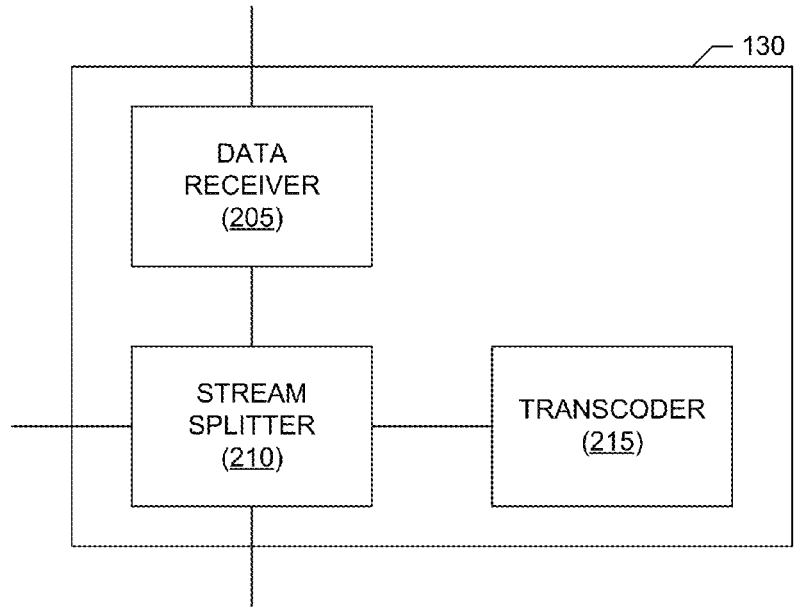
FIG. 2 is block diagram of an example stream processor that may be used to implement the example communication system of FIG. 1.

A block diagram depicting an example implementation of the stream processor 130 of FIG. 1 is illustrated in FIG. 2. The example stream processor 130 of FIG. 2 includes an example data receiver 205 to receive data stream(s) from one or more data sources, such as the data source(s) 115. The example stream processor 130 of FIG. 2 also includes an example stream splitter 210 to split an incoming data stream from a data source into respective portions forming a group of partial streams to be distributed to user devices, such as the user devices 105A-E, via established data connections. In some examples, the stream splitter 210 is configured (e.g., by the session manager 135) with respective data transmission characteristics for each of the data connections and, thus, for each of the partial data streams into which the incoming data stream is to be split. For example, each data connection and associated partial data stream can be associated with a respective bandwidth limit, data rate limit, etc., tailored to the device capabilities of the particular user device that is to receive that partial data stream. Accordingly, in some examples, the stream splitter 210 may split the incoming data stream into partial data streams having different data transmission characteristics, whereas in other examples, the stream splitter 210 may split the incoming data stream into partial data streams having similar, or the same, data transmission characteristics.

In some examples, the example stream processor 130 of FIG. 2 further includes an example transcoder 215 to transcode the data as it is being split from the incoming data stream into the partial data streams. The transcoder 215 performs transcoding to modify the characteristics of the data payload and/or control information included in the partial data streams generated by the stream splitter 210 from the incoming data stream. For example, based on the device capabilities of a particular user device associated with a particular data stream, the transcoder 215 may be used to modify the partial data stream to change the block size of the data payload, perform data interpolation on the data payload, re-encode control information included in the partial data stream, etc., to conform the partial data stream with one or more communication protocols supported by the user device. Accordingly, the transcoder 215 can support any number and/or type(s) of transcoding algorithms tailored to the expected device capabilities of user devices that are to receive the partial data streams generated by the stream processor 130.

Figure 3:
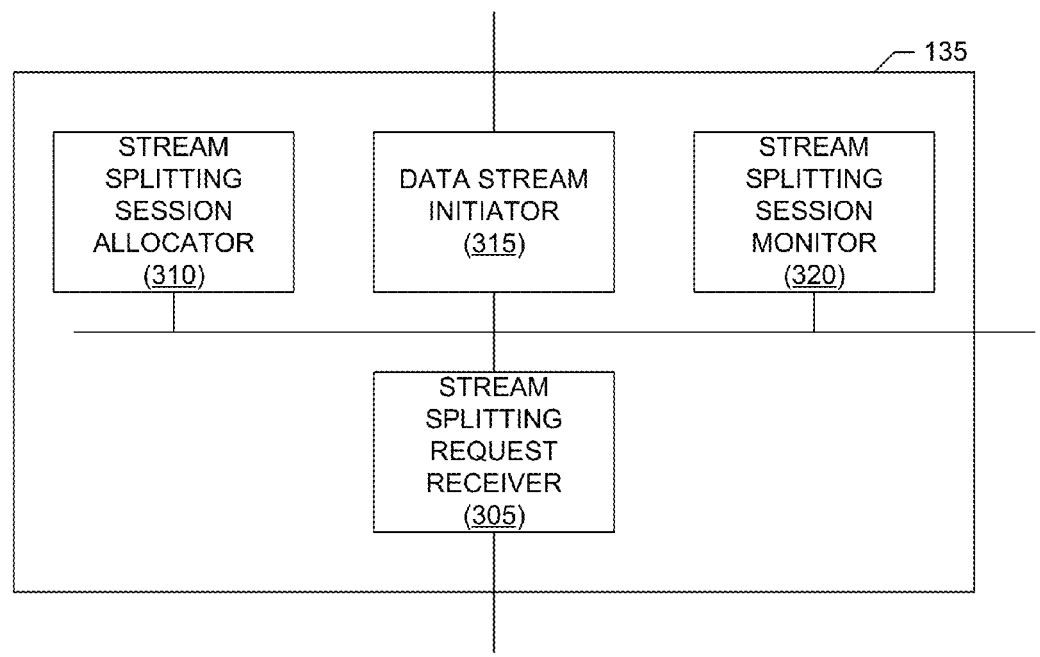
FIG. 3 is block diagram of an example session manager that may be used to implement the example communication system of FIG. 1.

A block diagram depicting an example implementation of the session manager 135 of FIG. 1 is illustrated in FIG. 3. The example session manager 135 of FIG. 3 includes an example stream splitting request receiver 305 to receive stream splitting session requests from user devices, such as the user devices 105A-E. As described above, a stream splitting session request includes, for example, data source identification information identifying a target data source, such as a data source 115, from which a user device, such as the user device 105A, is requesting that a data stream be provided. In some examples, the stream splitting session request can include information indicating the number of user devices that are to be included in (or added to) the stream splitting session via which the data stream from the identified target source is to be distributed, as described above. Moreover, in some examples, the stream splitting session request can identify the type of the stream splitting session request, such as an indication of whether the stream splitting session request is a single device request, a multi-device request, a hybrid request, etc., which are described above.

The example session manager 135 of FIG. 3 also includes an example stream splitting session allocator 310 to allocate data connections for the user devices to be included in a stream splitting session established in response to a stream splitting session request received by the stream splitting request receiver 305. In some examples, the stream splitting session allocator 310 processes the stream splitting request received by the stream splitting request receiver 305 to determine a number of user devices to be included in the stream splitting session being requested (e.g., by evaluating the number of user devices indicated in the stream splitting session request). The stream splitting session allocator 310 then assigns a number of communication ports to the requested stream splitting session based on the number of user devices (e.g., such as a number of communication ports greater than or equal to the number of devices to be included in the stream splitting session). In the case of single device requests and hybrid requests, as described above, the stream splitting session allocator 310 also generates a response to a received stream splitting session request containing, for example, communication port information to be used by the user devices for contacting the distribution system 120 and establishing the data connections to be used for receiving the partial data streams corresponding to the target data source identified in the stream splitting session request. In the case of multi-device requests, as described above, the stream splitting session allocator 310 responds to a particular multi-device request from a particular user device by selecting one of the communication ports assigned to the stream splitting session and using the port, in any appropriate manner, to establish the data connection with the user device directly. In some examples, the stream splitting session allocator 310 also assigns a session identifier to be used by the user devices when contacting the distribution system 120 to establish their respective data connections that form the stream splitting session. In such examples, the session identifier is used by the stream splitting session allocator 310 to associate received stream splitting session requests, and associated user devices, with particular stream splitting sessions.

In some examples, the stream splitting session allocator 310 actively determines device capability information for the user devices to be included in a stream splitting session. For example, in response to receiving a message (e.g., a stream splitting session request, a data connection request, etc.) from a user device at a provided communication port and/or including an appropriate session identifier and/or group code, the stream splitting session allocator 310 may exchange communication messages, such as network ping messages, with the device to determine respective device capability information, such as bandwidth and/or data rate capabilities, network latencies, etc., for the device. The stream splitting session allocator 310 then uses this device capability information to determine data transmission characteristics to be associated with the respective data connections established with the user devices included in the stream splitting session, as described above.

The example session manager 135 of FIG. 3 further includes an example data stream initiator 315 to initiate a data stream from the target data source identified in a stream splitting session request received by the stream splitting request receiver 305. For example, the data stream initiator 315 can initiate data streaming or another type of data download from the identified target data source, and indicate that the destination of the stream is a network address that is associated with the distribution system 120, which is further associated with a particular stream splitting session that was established in response to the received stream splitting session request. In such examples, the distribution system 120 can then determine that a data stream received at an address associated with a particular stream splitting session is to be distributed into partial data streams associated with that session by the stream processor 130 as disclosed herein.

In some examples, the session manager 135 of FIG. 3 includes an example stream splitting session monitor 320 to monitor the status of stream splitting sessions being used to distribute the communication of data streams among multiple user devices. For example, to monitor a stream splitting session associated with the user devices 105A-E, the stream splitting session monitor 320 can monitor for status update messages received from the primary user device 105A to indicate that the composition of the group of user devices 105A-E associated with the stream splitting session has changed (e.g., because user device(s) have entered or left the group). Additionally or alternatively, in some examples the stream splitting session monitor 320 can monitor that status of partial data streams being communicated to the group of user devices 105A-E associated with the stream splitting session to determine whether one or more of the streams has stalled (e.g., because acknowledgment(s) have not been received from one or more of the user devices 105A-E). In the illustrated example, in response to detecting a change in status of a stream splitting session, the stream splitting session monitor 320 notifies the stream splitting session allocator 310 to cause the data connections with the user devices 105A-E included in the session to be updated accordingly (e.g., to add/delete user connections, to adjust the allocation of data to the different partial data streams, etc.).

Figure 4:
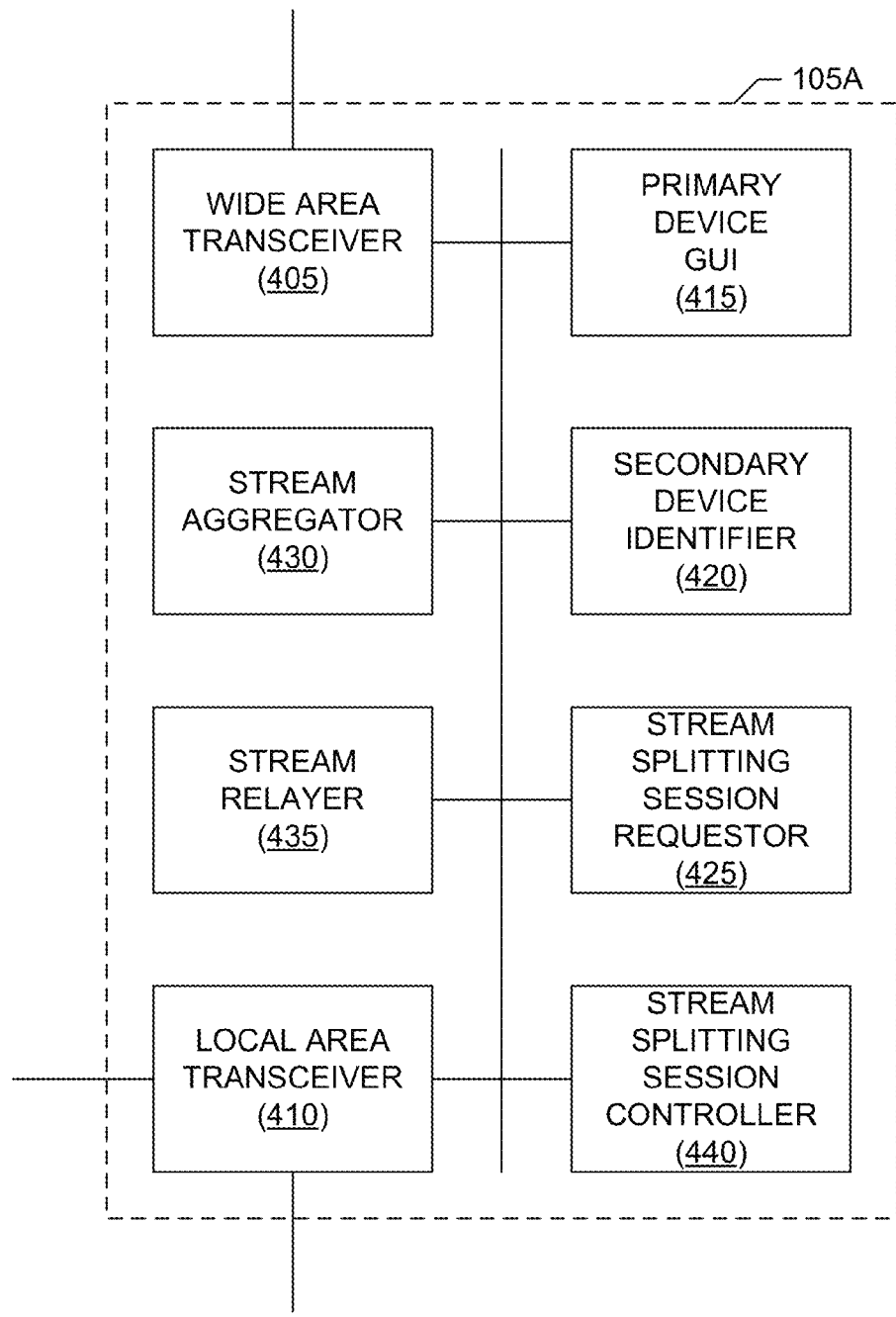
FIG. 4 is block diagram of an example primary device that may be used in the example communication system of FIG. 1.

A block diagram depicting an example implementation of the primary user device 105A of FIG. 1 is illustrated in FIG. 4. The example primary user device 105A of FIG. 4 includes an example wide area transceiver 405 that implements any number and/or type(s) of wireline and/or wireless communication interfaces, protocols, etc., to communicate with one or more of service provider networks, such as the service provider network(s) 110. The primary user device 105A of FIG. 4 also includes an example local area transceiver 410 that implements any number and/or type(s) of wireline and/or wireless communication interfaces, protocols, etc., to implement one or more local data connections with one or more other user devices, such as the user devices 105B-E. For example, the local area transceiver 410 can implement local data connections with other secondary devices via an ad-hoc network, tethering and/or any external data connection (such as a Wi-Fi connection, a Bluetooth connection, a universal serial bus (USB) connection, a docking connection, etc.).

The example primary user device 105A of FIG. 4 further includes an example primary device graphical user interface (GUI) 415 to provide an interface by which a user may invoke, monitor, modify, etc., a stream splitting session for distributing a data stream among multiple user devices, as disclosed herein. For example, the primary device GUI 415 can be implemented by an Internet browser, a wireless application protocol (WAP) browser, a JAVA application, etc. In some examples, the primary device GUI 415 provides an interface to enable a user to select a target data source, such as one of the target data source(s) 115, that is to provide the data stream whose communication is to be distributed among the multiple user devices via the stream splitting session. In some examples, the primary device GUI 415 also provides an interface to enable a user to select and/or otherwise identify other user devices, such as the user devices 105B-E, to be included with the primary user device 105A in the stream splitting session. For example, the primary device GUI 415 can cause the primary user device 105A to initiate any type of automated discovery process to detect the other user device(s) 105B-E that are within communication range of the primary user device 105A. Additionally or alternatively, the primary device GUI 415 may implement an interface to enable the user to manually enter user device identification information, such as phone number(s), URI(s), etc., for the other user device(s) 105B-E to be included with the primary device 105A in the stream splitting session. Furthermore, in some examples, the primary device GUI 415 provides an interface to enable the user to initiate establishment of the stream splitting session via which communication of a data stream is to be distributed among the multiple user devices. Also, in some examples, the primary device GUI 415 enables a user to specify whether location information for the primary device 105A is to be included in requests to establish such stream splitting sessions.

The example primary user device 105A of FIG. 4 further includes an example secondary device identifier 420 to identify the other (e.g., secondary) devices, such as the other user devices 105B-E, to be included with the primary user device 105A in the stream splitting session. For example, the primary device GUI 415 can initiate any type of automated discovery process to detect (e.g., via communication links established by the local area transceiver 410) the user device(s) 105B-E that are within communication range of the primary user device 105A. Additionally or alternatively, the primary device GUI 415 may receive secondary device identification information, such as phone number(s), URI(s), etc., entered manually via the primary device GUI 415 for the other device(s) 105B-E to be included with the primary device 105A in the stream splitting session.

The example primary user device 105A of FIG. 4 also includes an example stream splitting session requestor 425 to generate and send a stream splitting session request, as described above, to a distribution system, such as the distribution system 120, to request establishment of a stream splitting via which communication of a data stream from an identified target data source is to be distributed. For example, the stream splitting session requestor 425 can generate a stream splitting session request message including target source identification information (e.g., entered/selected via the primary device GUI 415) specifying the target data source 115 from which the data stream to be distributed is to be provided. Additionally or alternatively, in some examples, the stream splitting session request message generated by the stream splitting session requestor 425 can indicate the number of user devices 105A-E to be included in the stream splitting session, as described above. Additionally or alternatively, the stream splitting session request message generated by the stream splitting session requestor 425 can include a group code that identifies the group of user devices 105A-E (e.g., as a group) to be included in the stream splitting session. Additionally or alternatively, the stream splitting session request message generated by the stream splitting session requestor 425 can include a type identifier identifying the type of stream splitting session request be conveyed by the message (e.g., such as a single device request, a multi-device request, a hybrid request, etc.). Accordingly, the stream splitting session requestor 425 can be implemented to support the creation and sending of, and subsequent processing associated with, one or more of the different types of stream splitting session requests (e.g., single device requests, multi-device requests, hybrid requests, etc.) described above.

The example primary user device 105A of FIG. 4 further includes an example stream aggregator 430 to reorder and/or otherwise aggregate partial data streams received from other user devices 105B-E to form the complete data stream being provided by the target data source 115 identified in the stream splitting session request generated and sent to the distribution system 120 via the stream splitting session requestor 425. For example, the stream aggregator 430 of the illustrated example can receive, via the local communication links established using the local area transceiver 410, one or more of the partial data streams from the other user devices 105B-E that each form a part of the complete data stream being provided by the target data source 115. In some examples, the stream aggregator 430 receives the partial data streams from all of the other (e.g., secondary) user devices 105B-E and aggregates the partial data streams (e.g., possibly after reordering to account for different data packet arrival times at the different user devices 105A-E) to form the complete data stream being provided by the target data source 115. In some examples supporting hierarchical aggregation as described above (e.g., such as in the case of stream splitting sessions established using hybrid requests), the stream aggregator 430 receives the partial data streams from a subset of one or more of the other user devices 105B-E and aggregates the partial data streams (e.g., possibly after reordering to account for different data packet arrival times at the different user devices 105A-E) to form an intermediate aggregated data stream to be provided to another user device (e.g., such as a master device in the case of a stream splitting session established using hybrid requests), or any other device, that is to aggregate other intermediate aggregated data streams determined by other(s) of the devices 105A-E to form the complete data stream.

The example primary user device 105A of FIG. 4 also includes an example stream relayer 435 to relay (e.g., via the local area transceiver 410) the complete aggregated data stream, or an intermediate aggregated data stream in the case of an example hierarchical aggregation implementation, to a recipient. For example, the stream relayer 435 can communicate the complete data stream from the target data source 115, which is formed by the stream aggregator 430 through aggregating all of the partial data streams received by the primary user device 105A and the other user devices 105B-E, to the output device 125 for further processing, presentation, etc. As another example, the stream relayer 435 can communicate an intermediate aggregated data stream formed by the stream aggregator 430 through aggregating a subset of the partial data streams received by the primary user device 105A and a subgroup of the other user devices 105B-E to another of the user devices 105B-E for further aggregation.

In some examples, the primary user device 105A of FIG. 4 includes an example stream splitting session controller 440 to monitor and/or otherwise control a stream splitting session established in response to a stream splitting session request generated and sent by the stream splitting session requestor 425. For example, the stream splitting session controller 440 can detect, via data communications exchanged using the local area transceiver 410, one or more other user devices, such as one or more of the user devices 105B-E, entering or leaving an operating area, or otherwise becoming available or unavailable. Additionally or alternatively, the stream splitting session controller 440 can interface with the primary device GUI 415 to enable a user to manually enter changes in the composition of the user devices 105A-E to be included in the stream splitting session via which communication of the data stream provided by the target data source 115 is to be distributed. The stream splitting session controller 440 can then report such changes in the composition of the user devices 105A-E associated with the existing stream splitting session to enable the distribution system 120 to modify the stream splitting session accordingly.

Figure 5:
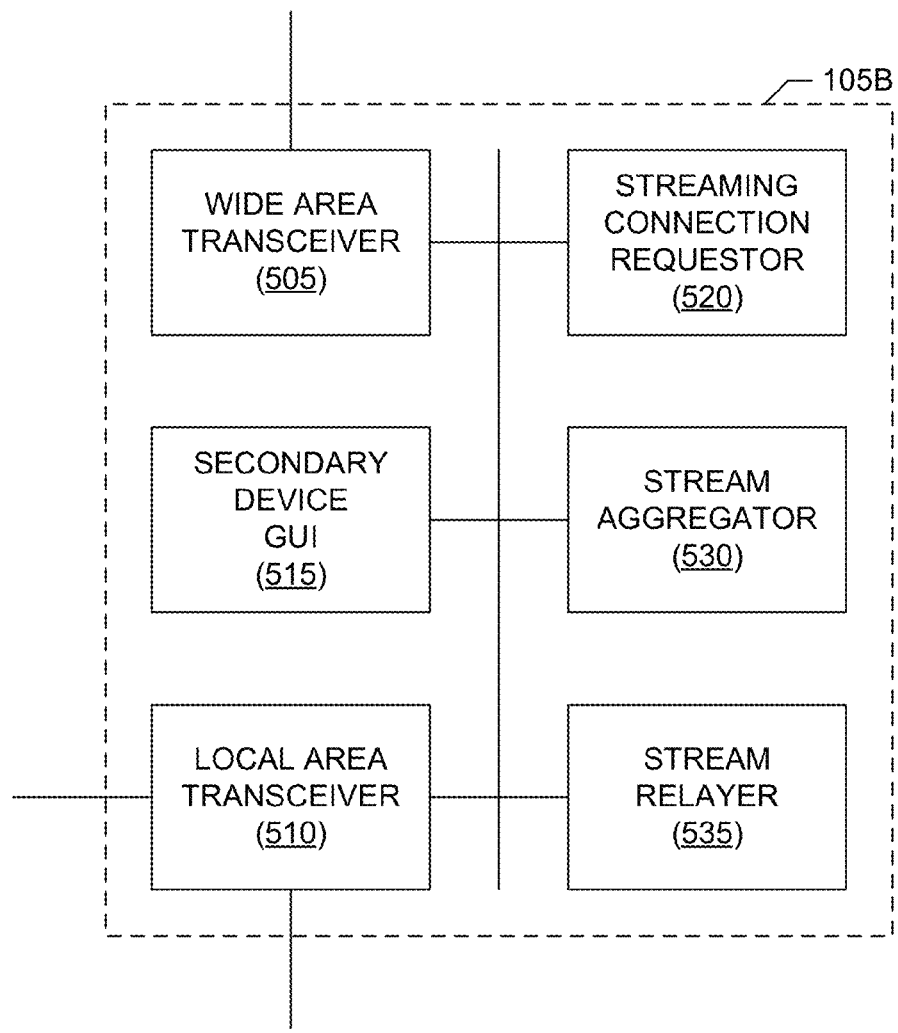
FIG. 5 is block diagram of an example secondary device that may be used in the example communication system of FIG. 1.

A block diagram depicting an example implementation of any one of the other (e.g., secondary) user devices 105B-E of FIG. 1 is illustrated in FIG. 5. For convenience and without loss of generality, the example block diagram of FIG. 5 is described from the perspective of implementing the secondary user device 105B, but the example of FIG. 5 could additionally or alternatively be used to implement other ones of the secondary user devices 105B-E. Turning to FIG. 5, the example secondary user device 105B of the illustrated example includes an example wide area transceiver 505 and an example local area transceiver 510, which may be similar to the wide area transceiver 405 and the example local area transceiver 410 included in the example primary user device 105A of FIG. 4.

In the illustrated example of FIG. 5, the example secondary user device 105B also includes an example secondary device GUI 515 to provide an interface by which a user may cause the secondary user device 105B to join a stream splitting session being established by a primary user device, such as the primary user device 105A. For example, the secondary device GUI 515 can be implemented by an Internet browser, a WAP browser, a JAVA application, etc. In some examples, the secondary device GUI 515 provides an interface to enable a user to cause the secondary user device 105B to announce (e.g., via data communications using the local area transceiver 510) its availability for joining a group of user devices, such as the group of devices 105A-E, to be included in a stream splitting session. In some examples, the secondary device GUI 515 additionally or alternatively provides an interface to enable a user to initiate establishment (e.g., based on sending a data connection request or a multi-device stream splitting session request, as described above) of a data connection with a distribution system, such as the distribution system 120, for use in receiving a partial data stream as part of a stream splitting session being used to distribute a data stream among multiple user devices. Also, in some examples, the secondary device GUI 515 enables a user to specify whether location information for the secondary device 105B is to be included in communications sent to the distribution system 120. In some examples, the secondary device GUI 515 additionally or alternatively provides an interface to enable a user to update the availability of the secondary user device 105B for inclusion in an existing stream splitting session. In such examples, in response to receiving a status update via the secondary device GUI 515, the secondary user device 105B can send the status update via its wide area transceiver 505 to the distribution system 120, or via its local area transceiver 510 to the primary user device 105A for reporting via the primary device's stream splitting session controller 440.

The example secondary user device 105B of FIG. 5 further includes an example streaming connection requestor 520 to establish a data connection with a distribution system, such as the distribution system 120, to thereby join a stream splitting session being used to distribute communication of a data stream among multiple devices. For example, the secondary user device 105B may receive communication port information (e.g., such as a network address and port number), a stream splitting session identifier, and possibly a group code, from the primary user device 105A for use in establishing a data connection with the distribution system 120 to thereby join a stream splitting session that was requested by the primary user device 105A for the purpose of distributing communication of a data stream from a target data source 115 among multiple devices, including the secondary user device 105B. In response to receiving such information, the streaming connection requestor 520 contacts the distribution system 120 (e.g., automatically or in response to a user input received via the secondary device GUI 515) using the port information, session identifier, group code, etc., which causes the distribution system 120 to establish a data connection with the secondary user device 105B, and to also associate the data connection and/or the secondary user device 105B with the stream splitting session already requested by the primary user device 105A.

In other examples, the secondary user device 105B may receive a group code, as well as a target source identifier and a total number of user devices to be included in a stream splitting session group, from the primary user device 105A for use in sending a multi-device stream splitting session request to the distribution system 120. In response to receiving such information, the streaming connection requestor 520 contacts the distribution system 120 (e.g., automatically or in response to a user input received via the secondary device GUI 515) by sending a multi-device stream splitting session request containing the group code, total number of user devices and target source identifier, which causes the distribution system 120 to establish the stream splitting session for the group (if it has not already been established) and to also establish a data connection with the secondary user device 105B, which is to be associated with the stream splitting session.

The example secondary user device 105B of FIG. 5 also includes an example stream aggregator 530 and an example stream relayer 535, which may be similar to the stream aggregator 430 and an example stream relayer 435 included in the primary user device 105A of FIG. 4. For example, the stream relayer 535 may be used to relay or otherwise communicate a partial data stream received via the wide area transceiver 505 of the secondary user device 105B, and associated with a target data stream being communicated by a stream splitting session, to the primary user device 105A or device for aggregation to form the complete data stream. Additionally or alternatively, the stream aggregator 530 may be used to aggregate the partial data stream received via the wide area transceiver 505 of the secondary user device 105B with partial data streams from one or more of the user devices 105A, C-E to, for example, implement hierarchical aggregation, as described above.

FIGS. 4 and 5 illustrate separate example implementations of primary devices and secondary devices that can be used in the example communication system 100 of FIG. 1. However, in some examples, a single user device may support some or all of the primary device functionality and the secondary device functionality illustrated in FIGS. 4 and 5. In such examples, a user device implementing both primary and secondary device functionality may be configured (e.g., via a GUI and/or messaging received from other devices) to act as a primary device or a secondary device. For example, a user device implementing both primary and secondary device functionality as illustrated in the examples of FIGS. 4 and 5 could operate as a primary device in a first stream splitting session used to distribute communication of a first data stream among a first group of devices, and later operate as a secondary device in a second stream splitting session used to distribute communication of a second data stream among a second group of devices, or vice versa.

While example manners of implementing the example communication system 100, the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530 and the example stream relayer 535 have been illustrated in FIGS. 1-5, one or more of the elements, processes and/or devices illustrated in FIGS. 1-5 may be combined, divided, re-arranged, omitted, eliminated and/or implemented in any other way. Further, the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530, the example stream relayer 535 and/or, more generally, the example communication system 100 of FIGS. 1-5 may be implemented by hardware, software, firmware and/or any combination of hardware, software and/or firmware. Thus, for example, any of the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530, the example stream relayer 535 and/or, more generally, the example communication system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communication system 100, the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530 and/or the example stream relayer 535 are hereby expressly defined to include a tangible computer readable medium such as a memory, digital versatile disk (DVD), compact disk (CD), Blu-ray Disc™, etc., storing such software and/or firmware.

Further still, the examples of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example communication system 100, the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530 and/or the example stream relayer 535 are shown in FIGS. 6, 7A-C, 8 and 9. In these examples, the machine readable instructions represented by each flowchart may comprise one or more programs for execution by a processor, such as the processor 1012 shown in the example processing system 1000 discussed below in connection with FIG. 10. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1012, but the entire program or programs and/or portions thereof could alternatively be executed by a device other than the processor 1012 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6, 7A-C, 8 and 9 may be implemented manually. Further, although the example machine readable instructions are described with reference to the flowcharts illustrated in FIGS. 6, 7A-C, 8 and 9, many other methods of implementing the example communication system 100, the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530 and/or the example stream relayer 535 may alternatively be used. For example, with reference to the flowcharts illustrated in FIGS. 6, 7A-C, 8 and 9, the order of execution of the blocks may be changed, and/or some of the blocks described may be changed, eliminated, combined and/or subdivided into multiple blocks.

As mentioned above, the example processes of FIGS. 6, 7A-C, 8 and 9 may be implemented using coded instructions (e.g., computer readable instructions) stored on a tangible computer readable storage medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk, and to exclude propagating signals. Additionally or alternatively, the example processes of FIGS. 6-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disk, and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
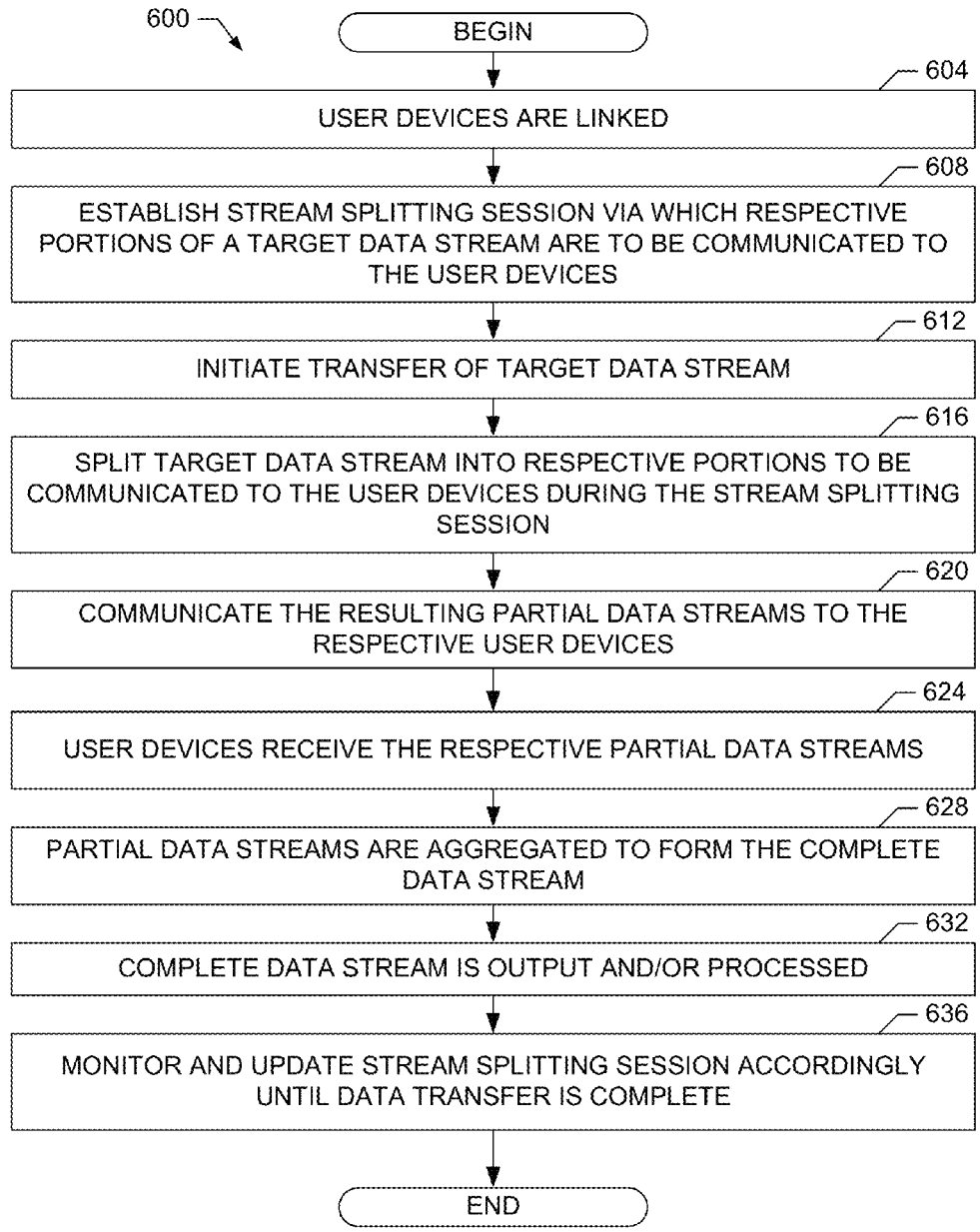
FIG. 6 is a flowchart representative of example machine readable instructions that may be executed to implement the example communication system of FIG. 1.

Example machine readable instructions 600 that may be executed to implement the example communication system 100 of FIG. 1 are represented by the flowchart shown in FIG. 6. For convenience, and without loss of generality, execution of the machine readable instructions 600 is described from the perspective of implementing a stream splitting session involving the user devices 105A-E of FIG. 1. With reference to the preceding figures and associated descriptions, the machine readable instructions 600 of FIG. 6 begin execution at block 604 at which the user devices 105A-E are linked via, for example, an ad-hoc network, tethering connections and/or other communication links, as described above. At block 608, a stream splitting session is established via which respective portions of a target data stream are to be communicated as respective partial data streams to the user devices 105A. In the illustrated example of FIG. 6, the stream splitting session can be established at block 608 using any of, for example, (1) the first mechanism described above in which the stream splitting session is initiated by the distribution system 120 in response to receiving a single device request from one of the user devices 105A-E, such as the user device 105A, on behalf of the group of user devices 105A-E to be included in the stream splitting session; (2) the second mechanism described above in which the stream splitting session is initiated by the distribution system 120 in response to receiving multi-device requests from each of the user devices 105A-E to be included in the stream splitting session; (3) the third mechanism described above in which the stream splitting session is initiated by the distribution system 120 in response to receiving hybrid requests from each of a set of primary devices on behalf of respective groups of devices to be included in the stream splitting session, etc.

At block 612, the distribution system 120 initiates the transfer of the data stream from the target data source 115 identified during establishment of the stream splitting session at block 608. At block 616, the distribution system 120 splits the complete data stream from the target data source 115 into respective portions to be communicated to the user devices 105A-E. At block 620, the distribution system 120 communications the respective portions of the data stream to the user devices 105A-E. For example, at block 620, the distribution system 120 communicates respective partial data streams, which correspond to the respective portions of the complete data stream after being split at block 616, to the user devices 105A-E via respective data connections established at block 608 during establishment of the stream splitting session. At block 624, the user devices 105A-E receive their respective partial data streams via their respective data connections with the distribution system 120. At block 628, the partial data streams are aggregated, as described above, to form the complete data stream being provided by the target data source 115. At block 632, the complete data stream formed by aggregating the partial data streams is output to, for example, the output device 125 and/or processed by one of the user devices, such as the primary user device 105A. At block 636, the stream splitting session is monitored and updated accordingly until the transfer of the data stream from the target source 115 is complete, as described above.

Figure 7A:
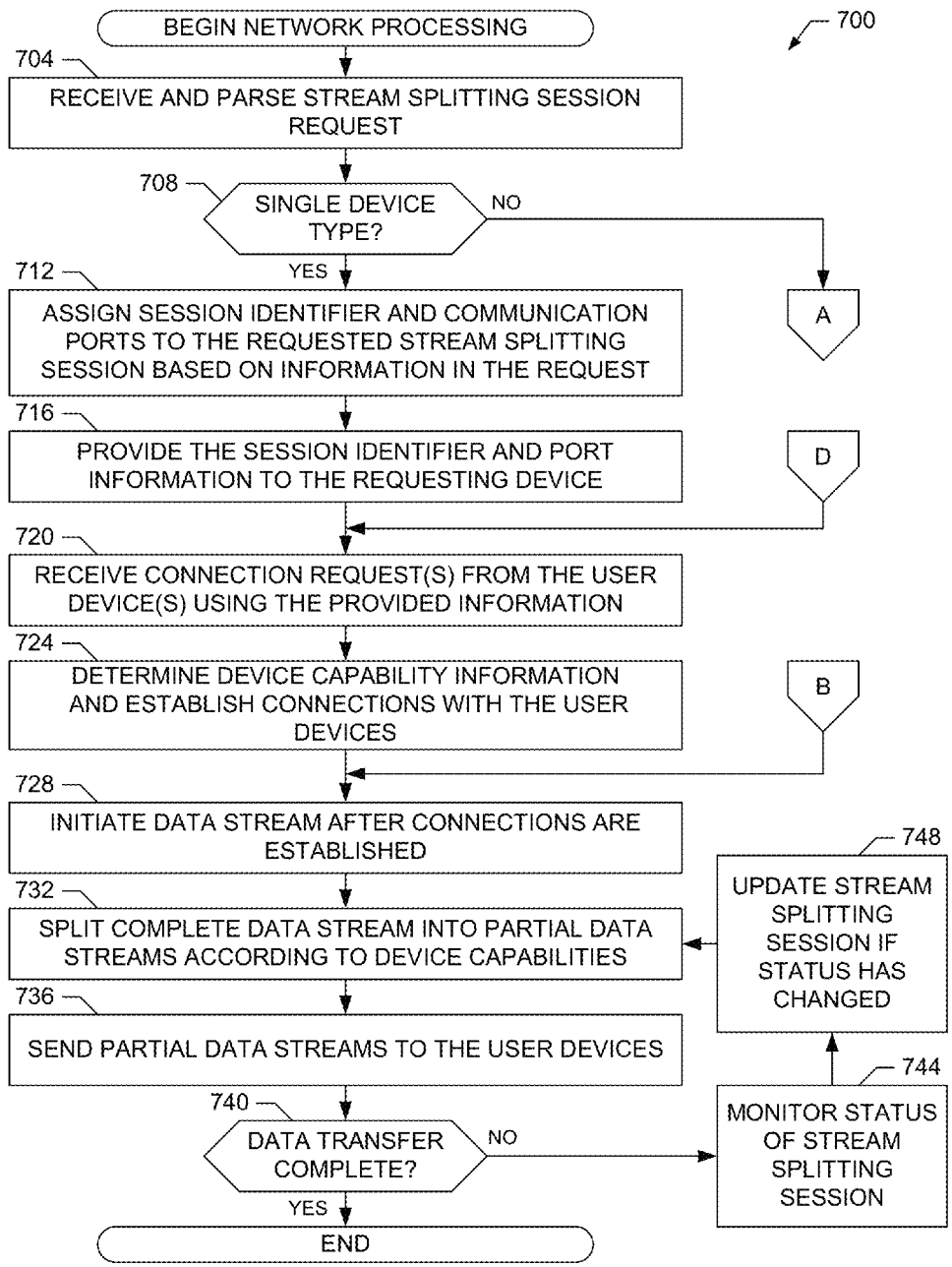
FIGS. 7A-C collectively are a flowchart representative of example machine readable instructions that may be executed to implement the example stream processor of FIGS. 1 and/or 2, and/or the example session manager of FIGS. 1 and/or 3.
Figure 7B:
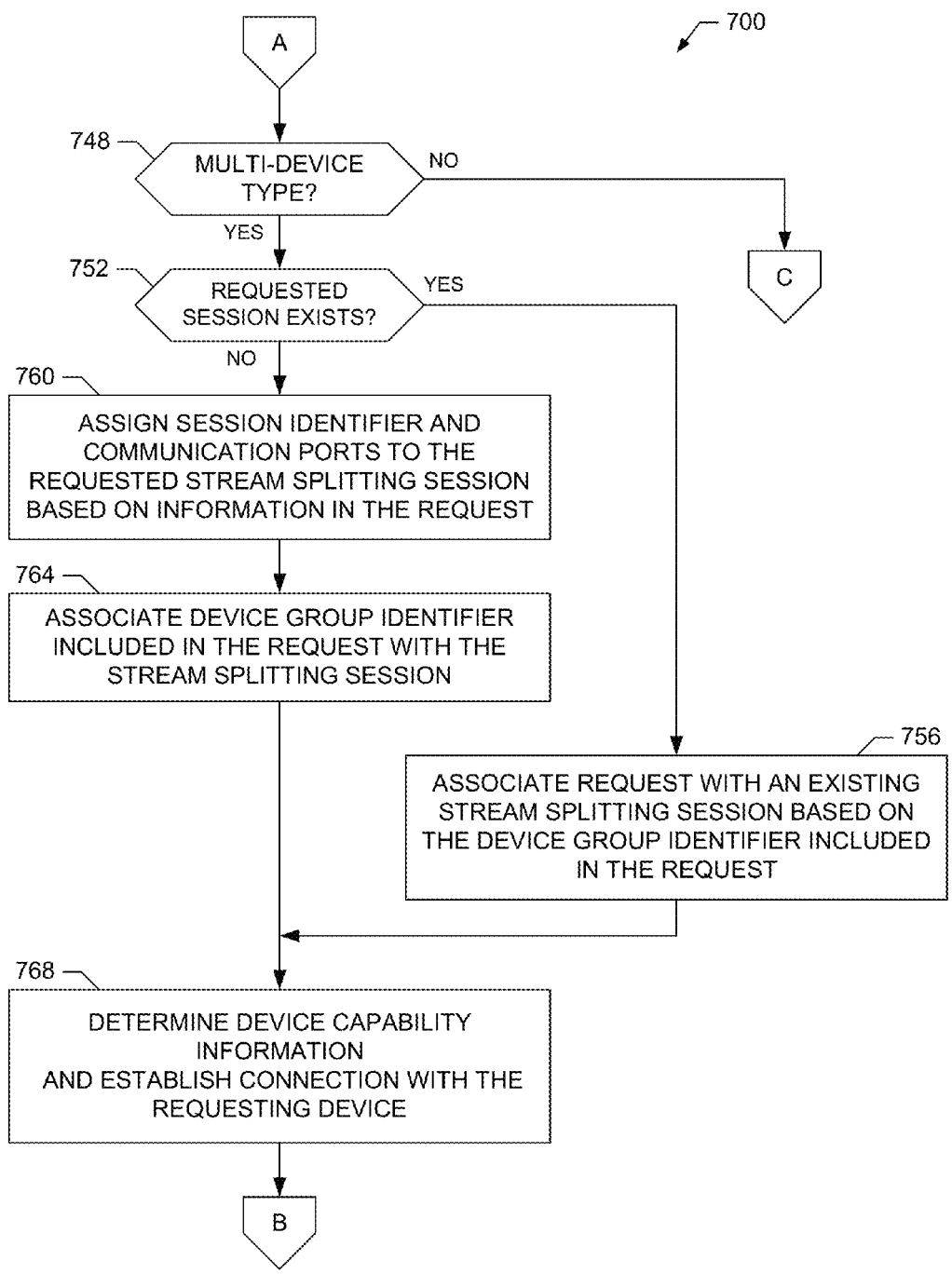
Figure 7C:
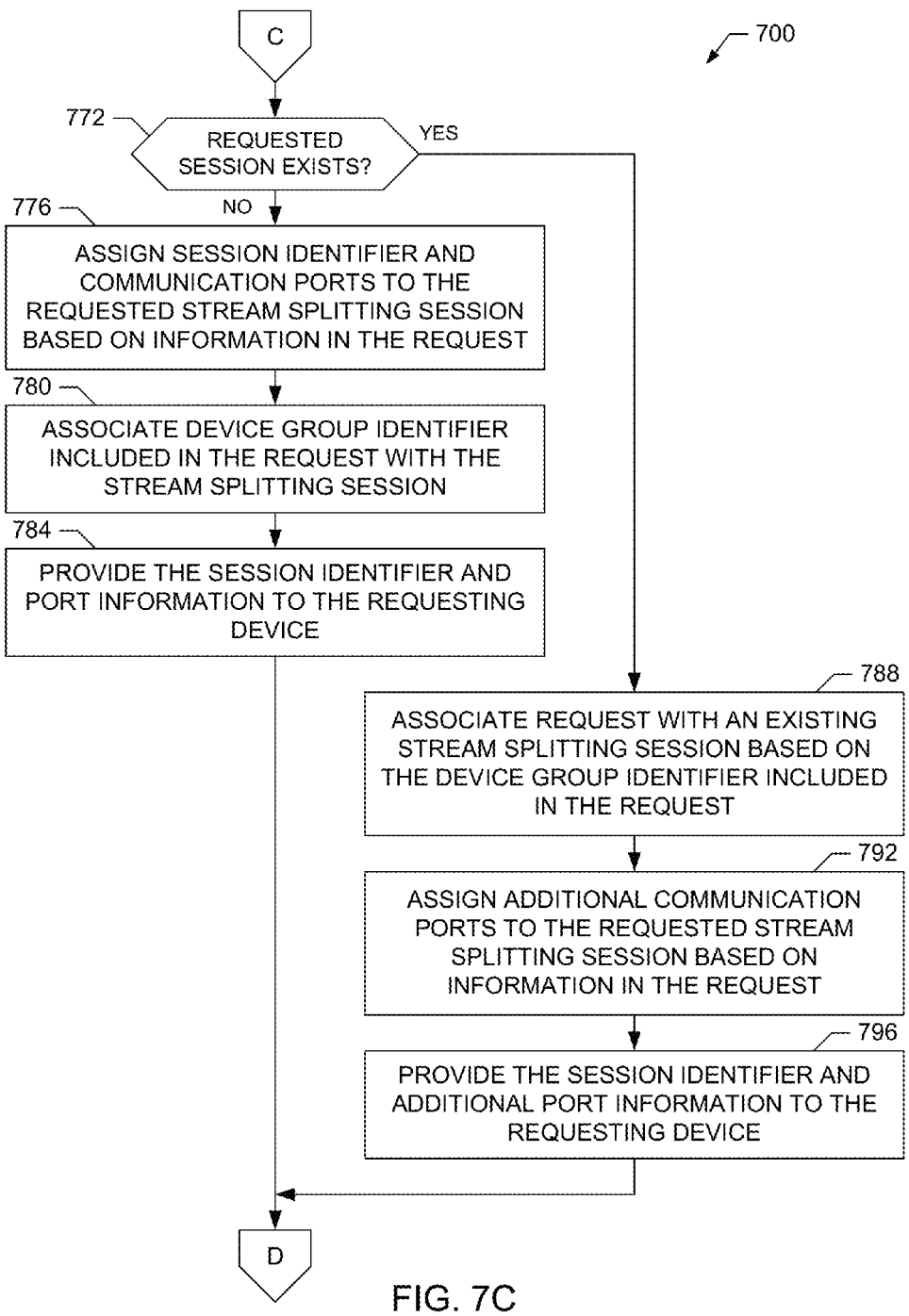

Example machine readable instructions 700 that may be executed to implement the example distribution system 120 and, more particularly, the example stream processor 130 and/or the example stream manager 135 of FIGS. 1-3 are represented by the flowchart shown in FIGS. 7A-C. For convenience, and without loss of generality, execution of the machine readable instructions 700 is described in the context of the stream processor 130 and the session manager 135 operating in the example communication system 100 of FIG. 1. Furthermore, execution of the machine readable instructions 700 is described from the perspective of implementing a stream splitting session involving the user devices 105A-E of FIG. 1. Turning to FIG. 7A, and with reference to the preceding figures and associated descriptions, the machine readable instructions 700 begin execution at block 704 at which the stream splitting request receiver 305 of the session manager 135 receives and parses a stream splitting session request from one of the user devices 105A-E. At block 708, the session manager 135 determines whether the received stream splitting session request corresponds to a single device request received from a primary device, such as the user device 105A acting as a primary device, on behalf of a group of user devices, such as the group of user devices 105A-E, to be included in the requested stream splitting session. For example, the received stream splitting session request may include information identifying the type of the stream splitting request. Additionally or alternatively, the session manager 135 may determine the type of request received at block 704 based on mapping the information included in the request to a particular type of request.

If the received stream splitting session request corresponds to a single device request (block 708), then at block 712 the stream splitting session allocator 310 of the session manager 135 assigns a session identifier to identify the requested stream splitting session. At block 712, the stream splitting session allocator 310 also assigns a number of communication ports to the requested stream splitting session that is at least equal to a number of devices indicated in the received stream splitting session request as being included in the stream splitting session. At block 716, the stream splitting session allocator 310 provides, as described above, port information identifying the communication ports assigned to the stream splitting session, as well as the session identifier in some examples, to the primary device 105A as a response to the stream splitting session request.

At block 720, the stream splitting session allocator 310 receives data connection requests from the user devices 105A-E at the provided communication ports and/or including the provided stream splitting session identifier, and establishes respective data connections with the user devices 105A-E in response to receiving the requests, as described above. At block 724, the stream splitting session allocator 310 actively determines device capability information for the user devices 105A-E to be included in the requested stream splitting session by, for example, exchanging communication messages, such a network ping messages, with each user device 105A-E to determine/measure device capability information, such as bandwidth and/or data rate capabilities, network latencies, etc.

After establishing the respective data connections with the user devices 105A-E, and associating respective device data transmission capabilities with the data connection established with the user devices 105A-E, at block 728 the data stream initiator 315 of the session manager 135 initiates transfer of a data stream from the target data source 115 using the source identification information included in the stream splitting session request received at block 704. For example, the data stream initiator 315 may determine that all respective data connections with the user devices 105A-E to be included in the stream splitting session have been established when data connections have been established with all of the communication ports assigned to the stream splitting session. Additionally or alternatively, the data stream initiator 315 may determine that all respective data connections with the user devices 105A-E to be included in the stream splitting session have been established when a timeout period has expired after receiving the first stream splitting session request or the first data connection request associated with the stream splitting session.

After the data stream is initiated at block 728, at block 732 the data receiver 205 of the stream processor 130 receives the data stream from the target data source 115, and the stream splitter 210 of the stream processor 130 splits the incoming data stream into partial data streams according to the data transmission characteristics associated with the respective data connections established with the user devices 105A-E, as described above. In some examples, at block 732, the transcoder 215 of the stream processor 130 may be invoked to perform transcoding of the partial data streams to conform them to the capabilities of the user devices 105A-E. At block 736, the stream splitter 210 sends the partial data streams to the user devices 105A-E using the established data connections, as described above.

If the transfer of the data stream is not complete and, thus, the data stream is still being received and split by the stream processor 130 (block 740), then at block 744, the stream splitting session monitor 320 of the session manager 135 monitors the status of the stream splitting session, as described above. At block 748, the stream splitting session allocator 310 updates the stream splitting session characteristics, as appropriate, in response to any detected changes in the status of the stream splitting session. For example, the stream splitting session allocator 310 may cause; (1) removal of the data connection(s) for any user device(s) 105A-E that is(are) no longer available; (2) establishment of new data connection(s) for new user device(s) that become available; (3) modification of data transmission characteristics associated with one or more of the established data connections based on detection of changes to the device capability, link status, etc.; and/or (4) any other appropriate change to the stream splitting session. Processing then returns to block 732 and blocks subsequent thereto at which the stream processor 130 continues to receive the incoming data stream and to split the incoming data stream into its component partial data streams for sending to the user devices 105A-E (although the data transmission characteristic(s) of the partial data stream may be modified in response to status update(s) received via the processing at block 744).

Returning to block 708, if the received stream splitting session request does not correspond to a single device request, then at block 748 of FIG. 7B, the session manager 135 determines whether the received stream splitting session request corresponds to a multi-device request received from one of the user devices 105A-E. If the received stream splitting session request corresponds to a multi-device request (block 748), then at block 752 the session manager 135 processes a group code included in the received multi-device request to determine whether a stream splitting session associated with the group of devices identified by the group code already exists. If there is an existing stream splitting session associated with the identified group of devices (block 752), then at block 756 the stream splitting session allocator 310 of the session manager 135 associates the received multi-device request with the existing stream splitting session associated with the group code included in the received multi-device request. If, however, there is no existing stream splitting session associated with the identified group of devices (block 752), then at block 760 the stream splitting session allocator 310 assigns a session identifier to identify the requested stream splitting session. At block 760, the stream splitting session allocator 310 also assigns a number of communication ports to the requested stream splitting session that is at least equal to a number of devices indicated in the received multi-device request as being included in the stream splitting session. Furthermore, at block 764, the stream splitting session allocator 310 associates the group code included in the received multi-device request with the requested stream splitting session.

After the received multi-device request is associated with an existing stream splitting session at block 756, or after processing completes at block 760 and 764 such that a new stream splitting session is assigned to the received multi-device request, processing proceeds to block 768. At block 768, the stream splitting session allocator 310 actively determines device capability information for the particular requesting user device 105A-E from which the multi-device request was received. For example, at block 768, the stream splitting session allocator 310 can exchange communication messages, such a network ping messages, with the requesting user device 105A-E to determine/measure device capability information, such as bandwidth and/or data rate capabilities, network latencies, etc. Furthermore, at block 768, the stream splitting session allocator 310 uses the determined device capability information and a communication port assigned to the stream splitting session associated with the received multi-device request to establish a data connection with the requesting user device 105A-E, as described above. Processing then proceeds to block 728 of FIG. 7A and subsequent blocks, which are described in detail above.

Returning to block 748 of FIG. 7B, if the received stream splitting session request does not correspond to a multi-device request, then the session manager 135 assumes that the received request corresponds to a hybrid request, and processing proceeds to block 772 of FIG. 7C. At block 772, the session manager 135 processes a group code included in the received hybrid request to determine whether a stream splitting session associated with the group of devices identified by the group code already exists. If there is no existing stream splitting session associated with the identified group of devices (block 772), then at block 776 the stream splitting session allocator 310 of the session manager 135 assigns a session identifier to identify the requested stream splitting session. At block 776, the stream splitting session allocator 310 also assigns a number of communication ports to the requested stream splitting session that is at least equal to a number of devices indicated in the received hybrid request as being included in the stream splitting session. Furthermore, at block 780, the stream splitting session allocator 310 associates the group code included in the received hybrid request with the requested stream splitting session. At block 784, the stream splitting session allocator 310 provides, as described above, port information identifying the communication ports assigned to the stream splitting session, as well as the session identifier in some examples, to the primary device from which the hybrid request was received. For example, the hybrid request may have been received from the user device 105A, which is acting as a primary device on behalf of the group of user devices 105A-C. Processing then proceeds to block 720 of FIG. 7A and subsequent blocks, which are described above. For example, if the hybrid request was received from the user device 105A acting as a primary device on behalf of the group of user devices 105A-C, then at block 720 of FIG. 7A and subsequent blocks, the stream splitting session would include just the user devices 105A-C.

However, if there is an existing stream splitting session associated with the identified group of devices (block 772), then at block 788 the stream splitting session allocator 310 of the session manager 135 associates the received hybrid request with the existing stream splitting session associated with the group code included in the received hybrid request. Then, at block 792, the stream splitting session allocator 310 assigns an additional number of communication ports to the existing stream splitting session that is at least equal to an additional number of devices indicated in the received hybrid request as being included in the stream splitting session. At block 796, the stream splitting session allocator 310 provides, as described above, port information identifying the additional communication ports assigned to the stream splitting session, as well as the session identifier in some examples, to the primary device from which the hybrid request was received. For example, the hybrid request may have been received from the user device 105D, which is acting as a primary device on behalf of the group of user devices 105D-E. Processing then proceeds to block 720 of FIG. 7A and subsequent blocks, which are described above. For example, if the hybrid request was received from the user device 105D acting as a primary device on behalf of the group of user devices 105D-E, the hybrid request included a group code identifying the entire group of devices 105A-E, and the stream splitting session was already established for the group of user devices 105A-C, then at block 720 of FIG. 7A and subsequent blocks, the stream splitting session would be updated to include both the first group of user devices 105A-C and the second (e.g., new) group of user devices 105D-E.

The example machine readable instructions 700 represented by the flowchart of FIGS. 7A-C correspond to an example implementation of the distribution system 120 that supports receiving single device, multi-device and hybrid stream splitting session requests. However, in other examples, the distribution system 120 may support just one or a subset of these types of splitting session requests. In such examples, the machine readable instructions 700 can be modified to include only blocks implementing the functionality associated with the respective type(s) of stream splitting session requests supported by the distribution system 120.

Figure 8:
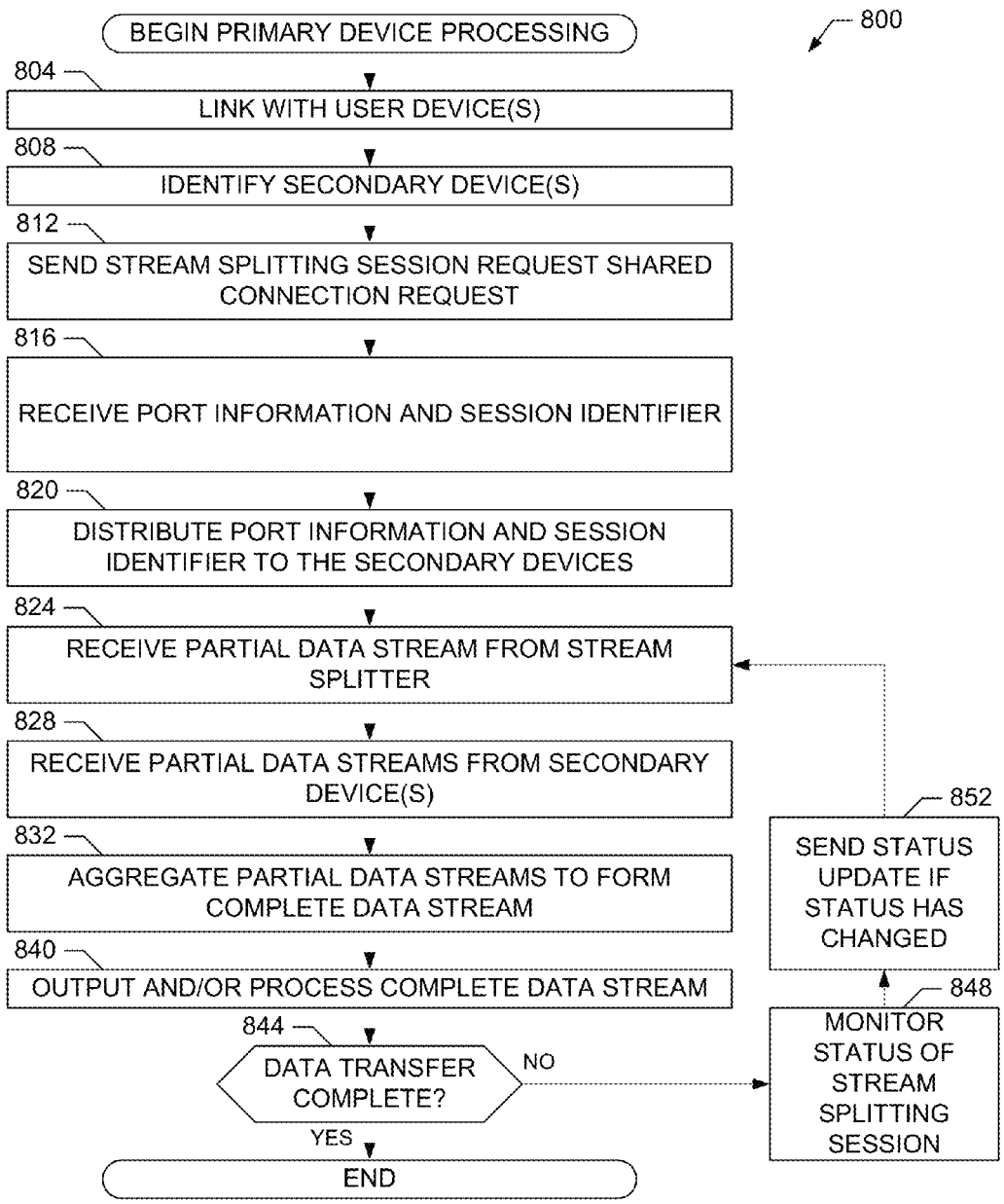
FIG. 8 is a flowchart representative of example machine readable instructions that may be executed to implement the example primary device(s) of FIGS. 1 and/or 4.

Example machine readable instructions 800 that may be executed to implement the example primary user device 105A of FIGS. 1 and/or 4 are represented by the flowchart shown in FIG. 8. For convenience, and without loss of generality, execution of the machine readable instructions 800 is described in the context of the user device 105A operating as a primary device in the example communication system 100 of FIG. 1. Turning to FIG. 8, and with reference to the preceding figures and associated descriptions, the machine readable instructions 800 begin execution at block 804 at which the primary user device 105A uses the primary user device's local area transceiver 410 to establish local data connections with one or more other user devices, such as the user devices 105B-E of FIG. 1, as described above. At block 808, the secondary device identifier 420 of the primary user device 105A identifies the secondary user devices 105B-E to be included in a stream splitting session for distributing communication of a data stream from a target data source 115. For example, at block 808, the primary user device 105A can use an auto-discovery procedure, information entered via the primary device GUI 415, etc., to identify the secondary user devices 105B-E, as described above. In some examples, at block 808, the primary user device 105A assigns a group code or other group identifier to the group of user devices 105A-E to be included in the stream splitting session, and forwards this group code to the other user devices 105B-E.

At block 812, the stream splitting session requestor 425 of the primary user device 105A generates and sends a stream splitting session request to the distribution system 120 to request a stream splitting session for distributing communication of a data stream being provided by an identified target data source 115. In the illustrated example of FIG. 8, the stream splitting session request includes information identifying the number of user devices 105A-E to be included in the stream splitting session being requested. The stream splitting session request initiated at block 812 also includes information identifying the target data (e.g., the target data source 115) that is to provide the data stream whose communication is to be distributed among the user devices 105A-E. In some examples, the stream splitting session request initiated at block 812 further includes a group code or other identifier used to represent the group of user devices 105A-E to be included in the stream splitting session. Accordingly, the stream splitting session request initiated at block 812 can correspond to a single device request, a multi-device request or a hybrid request, as described above.

In some examples, such as when the stream splitting session request initiated at block 812 corresponds to a single device request or a hybrid request, at block 816, the stream splitting session requestor 425 receives port information and a stream splitting session identifier from the distribution system 120 in response to the stream splitting request initiated at block 812, as described above. At block 820, the stream splitting session requestor 425 distributes (e.g., via the local communication links established at block 804) the port information and/or the session identifier to the secondary user devices 105B-E to be included in the stream splitting session, as described above. For example, the port information received at block 816 may identify to the communication ports assigned to the stream splitting session. In such examples, the stream splitting session requestor 425 of the primary user device 105A may forward a different communication port number to each respective secondary user device 105B-E. As noted above, the port information and/or session identifier are used by the user devices 105A-E to establish respective data connections with the distribution system 120.

After the stream splitting session is established, at block 824 the primary user device 105A begins receiving, via its wide area transceiver 405, a partial data stream corresponding to a portion of the complete data stream being provided by the target data source 115 identified in the stream splitting session request. At block 828, the stream aggregator 430 of the primary user device 105A receives, via the local communication links established at block 804, the partial data streams received by the other (e.g., secondary) user devices 105B-E included in the stream splitting session. At block 832, the stream aggregator 430 aggregates, as described above, the partial data streams (e.g., possibly after reordering to account for different data packet arrival times at the different user devices 105A-E) to form the complete data stream being provided by the target data source 115. At block 836, the primary user device 105A performs any appropriate post-processing on the aggregated, complete data stream, and/or the stream relayer 435 of the primary user device 105A outputs the complete data stream for use by another device, such as the output device 125.

If the transfer of the data stream is not complete and, thus, the data stream is still being communicated (block 844), then at block 848 the stream splitting session controller 440 of the primary user device 105A monitors the status of the stream splitting session, as described above. For example, the stream splitting session controller 440 can detect changes in the composition (e.g., membership) of the group of user devices 105A-E (e.g., such as when device(s) enter and/or leave an operating area) automatically (e.g., via communications exchanged using the local area transceiver 410) and/or manually (e.g., via information entered via the primary device GUI 415). At block 852, the stream splitting session controller 440 sends (e.g., via its wide area transceiver 405) any status updates to the distribution system 120. Processing then returns to block 824 and blocks subsequent thereto at which the primary user device 105A continues to receive its partial data stream corresponding to a portion of the complete data stream being provided by the target data source 115 (although the data transmission characteristic(s) of the partial data stream may be modified by the distribution system 120 in response to status update(s) received via the processing at block 852).

Figure 9:
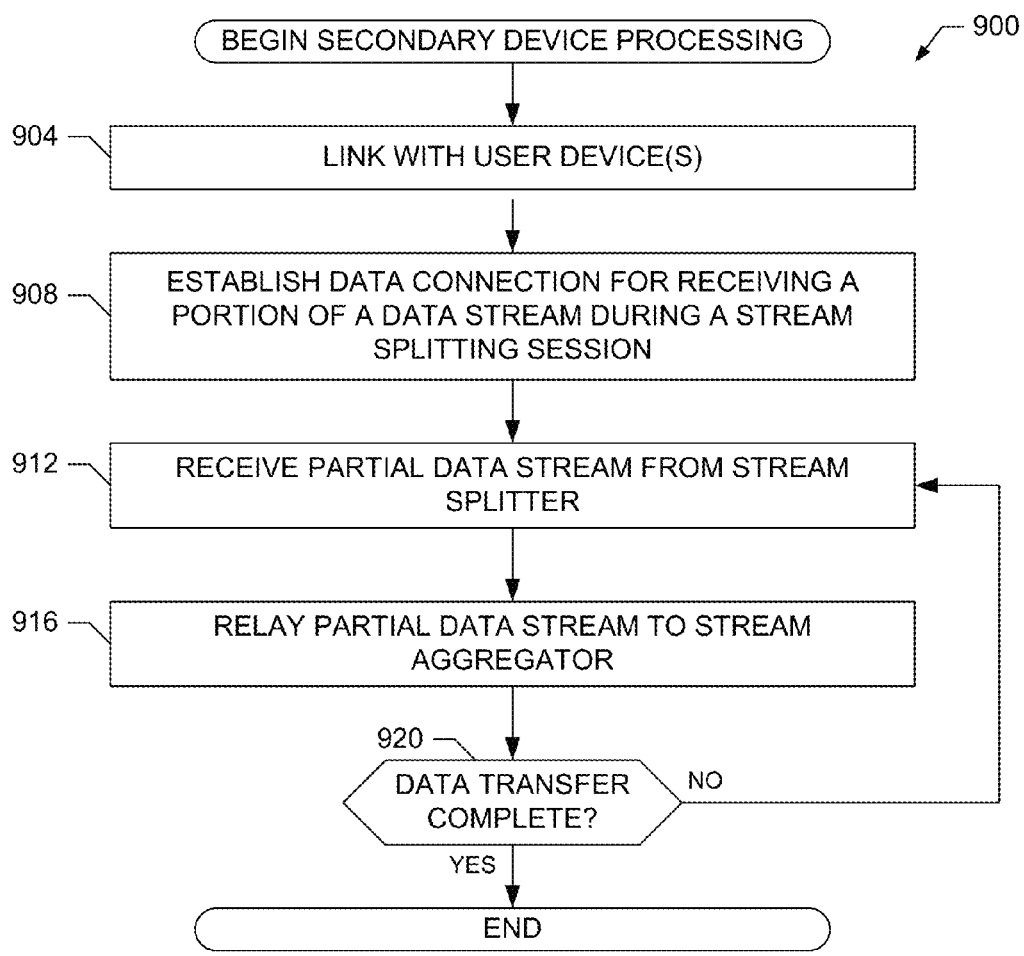
FIG. 9 is a flowchart representative of example machine readable instructions that may be executed to implement the example secondary device(s) of FIGS. 1 and/or 5.

Example machine readable instructions 900 that may be executed to implement one or more of the example secondary user devices 105B-E of FIGS. 1 and/or 5 are represented by the flowchart shown in FIG. 9. For convenience, and without loss of generality, execution of the machine readable instructions 900 is described in the context of the user device 105B operating as a secondary user device in the example communication system 100 of FIG. 1. Turning to FIG. 9, and with reference to the preceding figures and associated descriptions, the machine readable instructions 900 begin execution at block 904 at which the secondary user device 105B uses its local area transceiver 510 to establish a local communication link with a primary device, such as the primary user device 105A, and/or one or more other user devices, such as the user devices 105C-E, as described above. At block 908, the streaming connection requestor 520 of the secondary user device 105B establishes a data connection with the distribution system 120 for use in a stream splitting session via which a portion of a target data stream is to be communicated to the user device 105B, as described above. In some examples, at block 908, the streaming connection requestor 520 may receive port information (and possibly a stream splitting session identifier) from a primary device, such as the primary device 105A, and use the port information to contact the distribution system 120 and establish a data connection between the user device 105B and the distribution system 120 for use during the stream splitting session. In other examples, the streaming connection requestor 520 may receive a group code from a primary device, such as the primary device 105A, which identifies the group of user devices 105A-E to be included in the stream splitting session. In such examples, the streaming connection requestor 520 may send a multi-device request including the group code to cause the stream splitting session to be established (if it is not established already) and to cause a data connection to be established between the user device 105B and the distribution system 120 for use during the stream splitting session.

At block 912, the secondary user device 105B begins receiving, via its wide area transceiver 505, a partial data stream corresponding to a portion of the complete data stream being provided by a target data source 115 (e.g., which is the subject of the stream splitting session which the secondary user device 105B has joined). At block 916, the stream relayer 535 of the secondary user device 105B outputs the received partial data stream for use by another device, such as the primary user device 105A, that is to aggregate the partial data streams received by the user device 105B and the other user devices included in the stream splitting session. If the transfer of the data stream is not complete and, thus, the data stream is still being communicated (block 920), then processing then returns to block 912 and blocks subsequent thereto at which the secondary user device 105B continues to receive its partial data stream corresponding to its portion of the complete data stream being provided by the target data source 115 (although the data transmission characteristic(s) of the partial data stream may be modified by the distribution system 120 in response to changes in the status of the stream splitting session, as described above).

Figure 10:
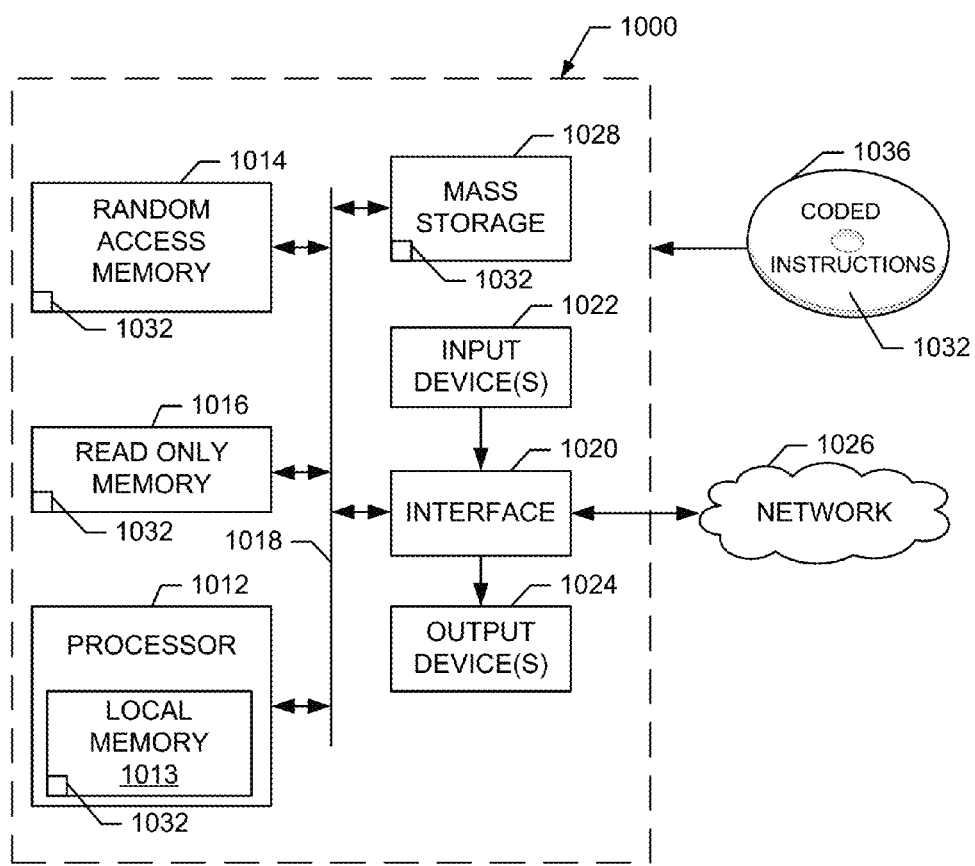
FIG. 10 is a block diagram of an example processing system that may execute the example machine readable instructions of FIGS. 6, 7A-C, 8 and/or 9 to implement the example communication system of FIG. 1, the example stream processor of FIGS. 1 and/or 2, the example session manager of FIGS. 1 and/or 3, the example primary device(s) of FIGS. 1 and/or 4, and/or the example secondary device(s) of FIGS. 1 and/or 5.

FIG. 10 is a block diagram of an example processing system 1000 capable of executing the instructions of FIGS. 6, 7A-C, 8 and/or 9 to implement the example communication system 100, the example user devices 105A-E, the example service provider network(s) 110, the example data source(s) 115, the example distribution system 120, the example output device 125, the example stream processor 130, the example session manager 135, the example data receiver 205, the example stream splitter 210, the example transcoder 215, the example stream splitting request receiver 305, the example stream splitting session allocator 310, the example data stream initiator 315, the example stream splitting session monitor 320, the example wide area transceiver 405, the example local area transceiver 410, the example primary device GUI 415, the example secondary device identifier 420, the example stream splitting session requestor 425, the example stream aggregator 430, the example stream relayer 435, the example stream splitting session controller 440, the example wide area transceiver 505, the example local are transceiver 510, the example secondary device GUI 515, the example streaming connection requestor 520, the example stream aggregator 530 and/or the example stream relayer 535 of FIGS. 1-5. The processing system 1000 can be, for example, a server, a personal computer, a mobile device (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1000 of the instant example includes a processor 1012. For example, the processor 1012 can be implemented by one or more microprocessors and/or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processing system 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, a trackbar (such as an isopoint), a voice recognition system and/or any other human-machine interface.

One or more output devices 1024 are also connected to the interface circuit 1020. The output devices 1024 can be implemented, for example, by display devices (e.g., a liquid crystal display, a cathode ray tube display (CRT)), a printer and/or speakers. The interface circuit 1020, thus, typically includes a graphics driver card.

The interface circuit 1020 also includes a communication device, such as a modem or network interface card, to facilitate exchange of data with external computers via a network 1026 (e.g., an Ethernet connection, a digital subscriber line (DSL), a telephone line, coaxial cable, a cellular telephone system, etc.).

The processing system 1000 also includes one or more mass storage devices 1028 for storing machine readable instructions and data. Examples of such mass storage devices 1028 include floppy disk drives, hard drive disks, compact disk drives and digital versatile disk (DVD) drives.

Coded instructions 1032 corresponding to the instructions of FIGS. 6, 7A-C, 8 and/or 9 may be stored in the mass storage device 1028, in the volatile memory 1014, in the non-volatile memory 1016, in the local memory 1013 and/or on a removable storage medium, such as a CD or DVD 1036.

It will be appreciated that example methods, apparatus and articles of manufacture (e.g., storage media) for distributing communication of a data stream among multiple devices have been disclosed. Distributing communication of a data stream among multiple devices as disclosed herein has many possible applications. For example, suppose a group of people, all of whom own smartphones, are congregating at a friend's home and would like to watch a newly released movie from Netflix®, but the owner of the home doesn't have broadband Internet service. Using data stream distribution as disclosed herein, this group of people could link their phones together via local data connections (such as an ad-hoc network) which also links one or more of the phones to a television (e.g., via a high-definition multimedia interface (HDMI) port). Furthermore, one of the smartphones, such as the smartphone belonging to the owner of the home, could be used as a primary device, as described above.

In such an example, the distribution system is contacted by the primary device and provided with the number of secondary devices being used, as well as the location (e.g., network access information) of the movie the group intends to watch. The distribution system provides the primary device with the ports to which the secondary devices should connect. The primary device passes these port assignments along to the secondary devices. which then connect to the assigned ports. Once the stream splitting session has been established and connections have been established with all of the devices, the distribution system, using the Netflix® credentials supplied by the primary device, initiates the video streaming process. As the individual stream of packets reaches the distribution system, the packets are split into respective partial data streams that are forwarded to the smartphones included in the stream splitting session. Any appropriate stream splitting algorithm could be used to distribute respective portions of the incoming data stream among the different user devices.

In some examples, the primary device (e.g., the homeowner's smartphone) will serve as the aggregator and organizer of the video stream. In such examples, when each device receives the packets sent to it by the distribution system, the device relays its received packets to the primary device, which reorders/aggregates the packets into their proper sequence and forwards the video stream to the television (e.g., via the HDMI port).

As noted above, there are many ways for the devices to aggregate and organize the data, such as either individually or through a cooperative (e.g., hierarchical) effort. Also, there are a number of ways for the user devices to link with each other, as well as with the distribution system.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to distribute communication of a data stream, the method comprising:

in response to a request received from a first device, assigning a first number of communication ports to a stream splitting session via which respective different portions of the data stream are to be split from the data stream and communicated concurrently to respective different ones of a plurality of devices;

determining a type of the request from among a plurality of possible types;

when the request corresponds to a first type of request, providing port information to the first device for distribution among the plurality of devices, the port information to be used to establish respective data connections via which the respective different portions of the data stream are to be communicated concurrently to the respective different ones of the plurality of devices during the stream splitting session; and when the request corresponds to a second type of request different from the first type of request, using a first one of the communication ports to establish a first data connection with the first device via which a first portion of the data stream is to be received by the first device during the stream splitting session, wherein the second type of request corresponds to a multi-device request to be received from respective ones of a group of devices to be included in the stream splitting session, and the multi-device request identifies a source of the data stream, a number of devices to be included in the stream splitting session, and a group identifier to collectively represent the group of devices to be included in the stream splitting session.

2. The method of claim 1, wherein the first type of request corresponds to a single device request that is to be received from a primary device on behalf of a group of devices to be included in the stream splitting session, and the single device request identifies a source of the data stream and a number of devices to be included in the stream splitting session.

3. The method of claim 1, wherein the port information identifies the communication ports assigned to the stream splitting session, and the first number of communication ports is at least equal to a number of devices included in the plurality of devices.

4. The method of claim 1, wherein the request is a first request corresponding to the first type of request, the plurality of devices is a first plurality of devices, and further including:

receiving a second request corresponding to the first type of request from a second device;

further assigning a second number of communication ports, in addition to the first communication ports, to the stream splitting session; and providing second port information to the second device for distribution among a second plurality of devices, the second port information to be used by the second plurality of devices to establish respective data connections via which respective portions of the data stream are to be communicated during the stream splitting session, the communication of the data stream to be distributed among the first and second pluralities of devices during the stream splitting session.

5. The method of claim 4, wherein the first type of request corresponds to a hybrid request that is to be received from each of a plurality of primary devices on behalf of respective groups of devices to be included in the stream splitting session, and each respective hybrid device request identifies a source of the data stream, a number of devices included in the respective group of devices corresponding to the respective hybrid device request, and a group identifier to collectively represent the groups of devices to be included in the stream splitting session.

6. The method of claim 1, further including:
obtaining respective streaming capability information from the respective ones of the devices when the respective data connections are established with the respective ones of the devices;
splitting the data stream into the respective different portions to be communicated to the respective ones of the devices, the splitting to be performed based on the respective streaming capability information obtained from the respective ones of the devices;
monitoring for changes to the respective data connections established with the respective ones of the devices, and for an additional device to be added to the stream splitting session; and
adjusting the splitting based on a change detected via the monitoring.

7. A tangible machine readable storage medium including machine readable instructions which, when executed, cause a machine to perform operations comprising:
in response to a request received from a first device, assigning a first number of communication ports to a stream splitting session via which respective different portions of a data stream are to be split from the data stream and communicated concurrently to respective different ones of a plurality of devices;
determining a type of the request from among a plurality of possible types;
when the request corresponds to a first type of request, providing port information to the first device for distribution among the plurality of devices, the port information to be used to establish respective data connections via which the respective different portions of the data stream are to be communicated concurrently to the respective different ones of the plurality of devices during the stream splitting session; and
when the request corresponds to a second type of request different from the first type of request, using a first one of the communication ports to establish a first data connection with the first device via which a first portion of the data stream is to be received by the first device during the stream splitting session, wherein the second type of request corresponds to a multi-device request that is to be received from respective ones of a group of devices to be included in the stream splitting session, and the multi-device request is to identify a source of the data stream, a number of devices to be included in the stream splitting session, and a group identifier to collectively represent the group of devices to be included in the stream splitting session.

8. The tangible machine readable storage medium of claim 7, wherein the first type of request corresponds to a single device request that is to be received from a primary device on behalf of a group of devices to be included in the stream splitting session, and the single device request is to identify a source of the data stream and a number of devices to be included in the stream splitting session.

9. The tangible machine readable storage medium of claim 7, wherein the port information identifies the communication ports assigned to the stream splitting session, and the first number of communication ports is at least equal to a number of devices included in the plurality of devices.

10. The tangible machine readable storage medium of claim 7, wherein the request is a first request corresponding to the first type of request, the plurality of devices is a first plurality of devices, and the operations further include:
accessing a second request corresponding to the first type of request from a second device;
further assigning a second number of communication ports, in addition to the first communication ports, to the stream splitting session; and
providing second port information to the second device for distribution among a second plurality of devices, the second port information to be used by the second plurality of devices to establish respective data connections via which respective portions of the data stream are to be communicated during the stream splitting session, the communication of the data stream to be distributed among the first and second pluralities of devices during the stream splitting session.

11. The tangible machine readable storage medium of claim 10, wherein the first type of request corresponds to a hybrid request that is to be received from each of a plurality of primary devices on behalf of respective groups of devices to be included in the stream splitting session, and each respective hybrid device request is to identify a source of the data stream, a number of devices included in the respective group of devices corresponding to the respective hybrid device request, and a group identifier to collectively represent the groups of devices to be included in the stream splitting session.

12. The tangible machine readable storage medium of claim 7, wherein the operations further include:
obtaining respective streaming capability information from the respective ones of the devices when the respective data connections are established with the respective ones of the devices;
splitting the data stream into the respective different portions to be communicated to the respective ones of the devices, the splitting to be performed based on the respective streaming capability information obtained from the respective ones of the devices;
monitoring for changes to the respective data connections established with the respective ones of the devices, and for an additional device to be added to the stream splitting session; and
adjusting the splitting based on a change detected via the monitoring.

13. An apparatus to distribute communication of a data stream, the apparatus comprising:
memory including machine readable instructions; and
a processor to execute the machine readable instructions to perform operations including:
in response to a request received from a first device, assigning a first number of communication ports to a stream splitting session via which respective different portions of the data stream are to be split from the data stream and communicated concurrently to respective different ones of a plurality of devices;

determining a type of the request from among a plurality of possible types;

when the request corresponds to a first type of request, providing port information to the first device for distribution among the plurality of devices, the port information to be used to establish respective data connections via which the respective different portions of the data stream are to be communicated concurrently to the respective different ones of the plurality of devices during the stream splitting session; and when the request corresponds to a second type of request different from the first type of request, using a first one of the communication ports to establish a first data connection with the first device via which a first portion of the data stream is to be communicated to the first device during the stream splitting session, wherein the second type of request corresponds to a multi-device request that is to be received from each device in a group of devices to be included in the stream splitting session, and the multi-device request is to identify a source of the data stream, a number of devices to be included in the stream splitting session, and a group identifier to collectively represent the group of devices to be included in the stream splitting session.

14. The apparatus of claim 13, wherein the first type of request corresponds to a single device request that is to be received from a primary device on behalf of a group of devices to be included in the stream splitting session, the single device request is to identify a source of the data stream and a number of devices to be included in the stream splitting session, the port information identifies the communication ports assigned to the stream splitting session, and the first number of communication ports is at least equal to a number of devices included in the plurality of devices.

15. The apparatus of claim 13, wherein the request is a first request corresponding to the first type of request, the plurality of devices is a first plurality of devices, and the operations further include:

accessing a second request corresponding to the first type of request from a second device;

further assigning a second number of communication ports, in addition to the first communication ports, to the stream splitting session; and providing second information to the second device for distribution among a second plurality of devices, the second information to be used by the second plurality of devices to establish respective data connections via which respective portions of the data stream are to be communicated during the stream splitting session, the communication of the data stream to be distributed among the first and second pluralities of devices during the stream splitting session.

16. The apparatus of claim 15, wherein the first type of request corresponds to a hybrid request that is to be received from each of a plurality of primary devices on behalf of respective groups of devices to be included in the stream splitting session, and each respective hybrid device request is to identify a source of the data stream, a number of devices included in the respective group of devices corresponding to the respective hybrid device request, and a group identifier to collectively represent the groups of devices to be included in the stream splitting session.

17. The apparatus of claim 13, wherein the operations further include:

obtaining respective streaming capability information from the respective ones of the devices when the respective data connections are established with the respective ones of the devices;

splitting the data stream into the respective different to be communicated to the respective ones of the devices, the splitting to be performed based on the respective streaming capability information obtained from the respective ones of the devices;

monitoring for changes to the respective data connections established with the respective ones of the devices, and for an additional device to be added to the stream splitting session; and adjusting the splitting based on a change detected via the monitoring.

\* \* \* \* \*